(12) United States Patent
Ozaki

(10) Patent No.: US 9,252,590 B2
(45) Date of Patent: Feb. 2, 2016

(54) ELECTRIC AUTOMOBILE, IN-WHEEL MOTOR DRIVE DEVICE, AND MOTOR CONTROL METHOD

(75) Inventor: Takayoshi Ozaki, Iwata (JP)

(73) Assignee: NTN CORPORATION, Osaka (JP)

( * ) Notice: Subject to any disclaimer, the term of this patent is extended or adjusted under 35 U.S.C. 154(b) by 262 days.

(21) Appl. No.: 14/000,379

(22) PCT Filed: Feb. 10, 2012

(86) PCT No.: PCT/JP2012/053060
§ 371 (c)(1),
(2), (4) Date: Aug. 19, 2013

(87) PCT Pub. No.: WO2012/114901
PCT Pub. Date: Aug. 30, 2012

(65) Prior Publication Data
US 2013/0328512 A1 Dec. 12, 2013

(30) Foreign Application Priority Data

Feb. 25, 2011 (JP) ................................. 2011-039751
Feb. 25, 2011 (JP) ................................. 2011-039853

(51) Int. Cl.
*H02P 1/24* (2006.01)
*H02H 7/08* (2006.01)
(Continued)

(52) U.S. Cl.
CPC ............ *H02H 7/0822* (2013.01); *B60K 7/0007* (2013.01); *B60L 3/0061* (2013.01);
(Continued)

(58) Field of Classification Search
CPC ... Y02T 10/7005; B60W 10/08; H02P 21/141
USPC .................................. 318/483, 139, 727, 432
See application file for complete search history.

(56) References Cited

U.S. PATENT DOCUMENTS 4,540,922 A * 9/1985 Horvath et al. ................ 318/490
5,969,919 A * 10/1999 Kobayashi et al. ............. 361/23
(Continued)

FOREIGN PATENT DOCUMENTS

CN          1564765        1/2005
JP        2005-527174       9/2005
(Continued)

OTHER PUBLICATIONS

Chinese Office Action dated Feb. 3, 2015 in corresponding Chinese Patent Application No. 201280009939.3.
(Continued)

*Primary Examiner* — Rina Duda

(57) ABSTRACT

An electric vehicle is proposed which can achieve early detection of abnormal short-circuit of motor coils, thus avoiding various driving problems. The electric vehicle includes a motor unit configured to drive a wheel. The motor unit includes a synchronous motor with three-phase motor coils. The three-phase motor coils include a first motor coil, a second motor coil and a third motor coil of different phases. One end of the first motor coil, one end of the second motor coil and one end of the third motor coil are connected with each other at a neutral point in a star connection. The electric vehicle also includes an abnormal short-circuit monitor configured to detect an abnormal short-circuit of the motor coils, and also includes an abnormalities-responsive disconnection unit configured to electrically disconnect the motor coils from the neutral point.

14 Claims, 14 Drawing Sheets

(51) Int. Cl.
  *B60L 3/04* (2006.01)
  *B60L 3/00* (2006.01)
  *B60K 7/00* (2006.01)
  *H02P 29/02* (2006.01)

(52) U.S. Cl.
  CPC .............. *B60L 3/04* (2013.01); *H02H 7/0805* (2013.01); *H02P 29/021* (2013.01); *B60L 2240/429* (2013.01); *Y02T 10/642* (2013.01); *Y02T 10/7258* (2013.01)

(56) References Cited

U.S. PATENT DOCUMENTS

| | | | |
|---|---|---|---|
| 6,320,731 B1 * | 11/2001 | Eaves et al. | 361/42 |
| 7,019,479 B2 | 3/2006 | Tobias et al. | |
| 7,365,507 B2 * | 4/2008 | Kim et al. | 318/483 |
| 7,759,888 B2 * | 7/2010 | Matsui et al. | 318/400.29 |
| 2004/0257018 A1 | 12/2004 | Tobias et al. | |
| 2009/0000840 A1 * | 1/2009 | Murata | 180/65.5 |
| 2009/0284198 A1 * | 11/2009 | Shimana et al. | 318/400.21 |
| 2010/0076638 A1 * | 3/2010 | Kitanaka | 701/22 |
| 2011/0144848 A1 * | 6/2011 | Yoshizue et al. | 701/22 |
| 2011/0180336 A1 | 7/2011 | Kurata | |
| 2011/0248657 A1 * | 10/2011 | Endoh | 318/400.22 |

FOREIGN PATENT DOCUMENTS

| | | |
|---|---|---|
| JP | 2005-278277 | 10/2005 |
| JP | 2006-62461 | 3/2006 |
| JP | 2006-111032 | 4/2006 |
| JP | 2007-295658 | 11/2007 |
| JP | 2008-168790 | 7/2008 |
| JP | 2009-219271 | 9/2009 |
| JP | 2010-87261 | 4/2010 |
| JP | 2010-98790 | 4/2010 |
| JP | 2011-961 | 1/2011 |
| WO | WO 03/099632 | 12/2003 |

OTHER PUBLICATIONS

Japanese Office Action issued Jun. 17, 2014 in corresponding Japanese Patent Application No. 2011-039853.
International Search Report mailed Apr. 10, 2012 in corresponding International Application No. PCT/JP2012/053060.
Japanese Office Action issued Aug. 5, 2014 in corresponding Japanese Patent Application No. 2011-039751.
Japanese Office Action issued Sep. 30, 2014 in corresponding Japanese Patent Application No. 2011-039853.
PCT International Preliminary Report on Patentability mailed Sep. 6, 2013 in corresponding International Application No. PCT/JP2012/053060.
Chinese Office Action dated May 19, 2015 in corresponding Chinese Patent Application No. 201280009939.3.

* cited by examiner

OUTBOARD SIDE ← → INBOARD SIDE

ELECTRIC AUTOMOBILE, IN-WHEEL MOTOR DRIVE DEVICE, AND MOTOR CONTROL METHOD

CROSS REFERENCE TO THE RELATED APPLICATIONS

This application is a U.S. national stage patent application of PCT/JP2012/053060 filed Feb. 10, 2012 and claims foreign priority benefit of Japanese Patent Applications No. 2011-039751 and No. 2011-039853 both filed Feb. 25, 2011 in the Japanese Intellectual Property Office, the contents of all of which are incorporated herein by reference.

BACKGROUND OF THE INVENTION

1. Field of the Invention

The present invention relates to an electric vehicle, such as an in-wheel motor vehicle, that is equipped with motor(s) to drive wheels and that may be battery-powered or fuel cell-powered. The present invention also relates to an in-wheel motor drive system that may be associated with a drive wheel of a vehicle that may be an electric vehicle. The present invention also relates to a method of controlling a motor unit.

2. Description of Related Art

An electric vehicle may experience degradation in performance or malfunctions of a motor serving as a drive for the vehicle. This can significantly affect the travel performance or travel safety. Reliability of a motor, a wheel bearing and a reducer is an urgent concern for an in-wheel motor drive system which, due to its smaller size, has less materials used, involves rapid rotation of the motor, and etc.

A battery-powered electric vehicle may include a drive system which may be in the form of an in-wheel motor drive system. The drive system may employ an IPM (e.g., Interior Permanent Magnet synchronous motor). Such an IPM may include a neodymium magnet to provide a highly efficient performance, thus increasing the maximum travel range that is possible with a limited battery capacity.

In the past, in the attempt to ensure such reliability, an in-wheel motor drive system has been proposed in which the temperature of components such as a wheel bearing, a reducer and a motor may be measured and monitored for overload, with features to limit a drive current in/to the motor or a rotational frequency of the motor according to the temperature measurements (see the Patent Document 1 listed below).

[Patent Document 1] JP Laid-open Patent Publication No. 2008-168790

SUMMARY OF THE INVENTION

A motor for an electric vehicle—in particular, an IPM which includes a neodymium magnet—may experience abnormal short-circuit of motor coils. In the presence of such abnormal short-circuit, power may be generated in the motor. The generated power may become a braking force for the vehicle. When a vehicle is traveling at a high speed, its motor is undergoing rapid rotation. If abnormal short-circuit of the motor coils occurs under such a circumstance, this may give rise to various driving problems: for example, it may lead to a situation where driving of the vehicle is suddenly impossible. Another problem is that abnormal short-circuit of motor coils may result in constant application of a braking force to a motor. Towing of such a vehicle with another vehicle would be quite difficult.

An object of the present invention is to provide an electric vehicle, an in-wheel motor drive system, and a method of controlling a motor unit, which can achieve early detection of abnormal short-circuit of motor coils, thus avoiding various driving problems. The general aspects of the present invention will now be described using the reference signs in the figures showing embodiments of the present invention.

The present invention may provide an electric vehicle which includes a motor unit 6 configured to drive a wheel 2. The motor unit 6 includes a synchronous motor with three-phase motor coils 78. The three-phase motor coils 78 include a first motor coil, a second motor coil and a third motor coil of different phases. One end of the first motor coil, one end of the second motor coil and one end of the third motor coil are connected with each other at a neutral point P1 in a star connection. The electric vehicle also includes an ECU 21 which is an electronic control unit configured to perform general control of the vehicle. The electric vehicle also includes an inverter unit 22. The inverter unit 22 includes a power circuitry 28 including an inverter 31 configured to convert a DC power from a battery unit 19 into an AC power used to drive the motor unit 6, and also includes a motor control circuitry 29 configured to control at least the power circuitry 28 in accordance with control from the ECU 21. The electric vehicle also includes an abnormal short-circuit monitor 95 configured to detect an abnormal short-circuit of the motor coils 78, and also includes an abnormalities-responsive disconnection unit Es configured to electrically disconnect the motor coils 78 from the neutral point P1.

A synchronous motor with three-phase motor coils 78, where the three-phase motor coils 78 include a first motor coil, a second motor coil and a third motor coil of different phases, may be configured such that one end of the first motor coil, one end of the second motor coil and one end of the third motor coil is connected with each other at a neutral point P1 in a star connection. If an abnormal short-circuit of the motor coils 78 occurs during rotation of a motor unit, an abnormally large current may flow in the motor coils. This may result in sudden braking of rotation of the motor unit.

Hence, the abnormal short-circuit monitor 95 may continuously monitor if there is an abnormal short-circuit of the motor coils 78. The abnormalities-responsive disconnection unit Es may electrically disconnect the motor coils 78 from the neutral point P1, if the abnormal short-circuit monitor 95 detects an abnormal short-circuit of the motor coils 78. Continuously monitoring if there is an abnormal short-circuit of the motor coils 78 allows for early detection of abnormal short-circuit in a motor unit 6, and electrically disconnecting the motor coils 78 from the neutral point P1 if such an abnormal short-circuit is detected can prevent sudden braking of rotation of the motor unit 6. This enables avoiding a situation where driving of a vehicle is suddenly impossible.

As noted above, the disconnection occurs at the neutral point P1. In this way, if abnormal short-circuit occurs in any at least one of the first motor coil, the second motor coil and the third motor coil (U, V, W) of the three-phase motor coils 78, it is ensured that the rotational frequency of the motor unit 6 does not become undesirably high due to such short-circuit. If, in contrast, disconnection of the first motor coil, the second motor coil and the third motor coil was designed to occur between the inverter 31 and the motor unit 6, it would be unable to avoid braking of the motor unit 6 that may be caused by short-circuit of the motor coils. This is because, for example, a permanent magnet structure present in a motor rotor would generate, in response to such short-circuit of the motor coils, an electromotive force in the motor coils, thus creating a current flow in the coils. The phrase "abnormal short-circuit" used herein not only refers to a complete short-circuit but also encompasses at least some level of short-circuiting of current. Determination of whether there is at least some level of short-circuiting of current may be made based on a threshold that can be appropriately selected.

The abnormal short-circuit monitor 95 may be configured to determine if there is an abnormal short-circuit of the motor coils 78, based on measurements of supply currents of three phases that flow from the inverter 31 to the motor unit 6. The abnormal short-circuit monitor 95 may be configured to determine that there is an abnormal short-circuit of the motor coils 78, if a motor current for a given motor voltage exceeds a motor current threshold defined for the given motor voltage. This is because it can be estimated that there is a short-circuit in the motor unit 6, if a motor current for a given motor voltage is abnormally high. In a variant, the abnormal short-circuit monitor 95 may be configured to determine if there is an abnormal short-circuit of the motor coils 78, based on the level of variation among supply currents of three phases. A motor current for a given motor voltage may be determined in advance through experiments and/or simulations, and the values of a motor current at which abnormal short-circuits of the motor coils 78 occurred may be used as the aforementioned "motor current threshold". Where appropriate, a safety factor may be incorporated into the values of a motor current at which abnormal short-circuits of the motor coils 78 occurred, and the resulting values may be used as the aforementioned "motor current threshold".

The abnormalities-responsive disconnection unit Es may comprise a relay or an electronic switch. In such a case, one end of the first motor coil, one end of the second motor coil and one end of the third motor coil of the motor coils 78, may be connected with each other through the respective relays or electronic switches. The other end of the first motor coil, the other end of the second motor coil and the other end of the third motor coil of the motor coils 78, may be connected with the inverter 31.

The inverter unit 22 or the ECU 21 may include the abnormal short-circuit monitor 95. With a configuration where the inverter unit 22 includes the abnormal short-circuit monitor 95, the abnormal short-circuit monitor 95 that may detect an abnormal short-circuit of the motor coils 78 is positioned closer to the motor unit 6 than with a configuration where the ECU 21 includes the abnormal short-circuit monitor 95, thus the former configuration being more advantageous in terms of wire routing. Also, with a configuration where the inverter unit 22 includes the abnormal short-circuit monitor 95, an appropriate control can be initiated more quickly than with a configuration of the ECU 21 including the abnormal short-circuit monitor 95, thus promptly avoiding various driving problems. Furthermore, with the former configuration, the load on the ECU 21, whose complexity is increasing hand-in-hand with its sophistication, can be reduced.

In a configuration where the inverter unit 22 includes the abnormal short-circuit monitor 95, the inverter unit 22 may also include an abnormalities notifier 41 configured to send information indicating an abnormal short-circuit to the ECU 21, if the abnormal short-circuit monitor 95 detects an abnormal short-circuit of the motor coils 78. The ECU 21 performs general, integrated control of the vehicle. Thus, by sending information indicating an abnormal short-circuit to the ECU 21 if the abnormal short-circuit monitor 95 included in the inverter unit 22 detects an abnormal short-circuit of the motor coils 78, the ECU 21 can correspondingly perform an appropriate control of the vehicle in general. Also, the ECU 21 is an upper-level control unit which may send a drive command to the inverter unit 22. Thus, an urgent control performed by the inverter unit 22 may be followed by a more appropriate control of drive which is performed by the ECU 21.

An electric vehicle according to the present invention may further include an in-wheel motor drive system 8 which includes a wheel bearing unit 4, the motor unit 6 and a reducer unit 7 interposed between the motor unit 6 and the wheel bearing unit 4. Reliability of the wheel bearing unit 4, the reducer unit 7 and the motor unit 6 is an urgent concern for an in-wheel motor drive system 8 which, due to its smaller size, has less materials used, involves rapid rotation of the motor unit 6, and etc. Continuously monitoring if there is an abnormal short-circuit of the motor coils 78 of a motor unit 6 allows for early detection of abnormal short-circuit in the motor unit 6, and electrically disconnecting the motor coils 78 from the neutral point P1 if such an abnormal short-circuit is detected can prevent sudden braking of the motor unit 6. This enables avoiding a situation where driving of a vehicle is suddenly impossible.

An electric vehicle according to the present invention may further include a reducer unit 7 configured to produce rotation with a speed that is reduced with respect to that of rotation of the motor unit 6, wherein the reducer unit 7 may comprise a cycloidal reducer. Such a configuration in which the reducer unit 7 comprises a cycloidal reducer having, for example, a reduction ration of 1/6 or greater, allows for the provision of a smaller motor unit 6, thus achieving reduction in dimensions of the system or assembly. A reducer unit having a significant reduction ratio, while making it possible to achieve reduction in dimensions of the system or assembly as noted above, accompanies significant amplification of torque generated by a motor unit 6 which will be transmitted to the wheel 2. This may result in abrupt braking of the vehicle when abnormal short-circuit of the motor coils 78 occurs. The provision of an abnormal short-circuit monitor 95 can prevent such abrupt braking that may be caused by abnormal short-circuit of the motor coils 78. This enables avoiding a situation where driving of a vehicle is suddenly impossible.

The motor unit 6 may include an interior permanent magnet synchronous motor including a neodymium permanent magnet to provide a highly efficient performance. This increases the maximum travel range of a vehicle that is possible with a limited battery capacity. An abnormal short-circuit of the motor coils 78 which may occur in a motor unit including an interior permanent magnet synchronous motor is addressed, enabling avoiding a situation where power is generated in the motor unit 6 and the generated power becomes a braking force for the vehicle.

In a configuration in which the electric vehicle includes the in-wheel motor drive system 8, a moisture detector Sk configured to detect moisture in the motor unit 6 may be disposed in proximity to a terminal block 6a that may be associated with the motor unit 6.

A motor unit 6, if included in an in-wheel motor drive system 8, may be located near a wheel, thus being exposed to an environment in proximity to a road surface. In the aforementioned configuration, a moisture detector Sk disposed in proximity to a terminal block 6a associated with the motor unit 6 may continuously detect if there is moisture in the motor unit 6 or in a motor housing 72. The in-wheel motor drive system 8 may be configured to limit or shut off a motor current, based on a moisture detection signal. This is because it can be estimated that wires for the motor unit 6 are more susceptible to short-circuiting, if the moisture detector Sk detects moisture. In this way, abnormal short-circuit in a motor unit 6 which may be undergoing rapid rotation can be prevented. This enables avoiding a situation where driving of a vehicle is suddenly impossible. Wires in the motor unit 6 may be sheathed. The same wires, however, may be unsheathed near a terminal block 6a to provide a connection, thus being susceptible to short-circuiting if moisture enters the motor unit 6. The provision of a moisture detector Sk in proximity to a terminal block 6a enables detecting abnormal short-circuit more effectively.

The terminal block 6a may include a plurality of terminals 96 that are positioned in or within a motor housing 72 of the motor unit 6. In other words, the moisture detector Sk may be disposed in proximity to the plurality of terminals 96 that are positioned at such locations. In this way, moisture in the volume around exposed portions of electrically conductive paths 100 can be detected with precision. This not only ensures that moisture which can be the cause for short-circuiting is detected but also ensures that false detections are prevented.

A moisture-detection-responsive controller 102 may further be provided which is configured to monitor if a moisture detection signal produced from the moisture detector Sk meets a defined condition (i.e., a condition indicative of moisture exceeding a predefined amount) and to, upon determining that the defined condition is met, limit or shut off a motor current. This is because it can be estimated that a motor unit 6 which may be located near a wheel is more susceptible to short-circuiting, if a moisture detection signal produced from the moisture detector Sk meets the defined condition. A configuration of the moisture-detection-responsive controller 102, upon determining that the defined condition is met, limiting or shutting off a motor current enables achieving early detection of abnormalities in a motor unit 6, thus avoiding various driving problems.

The moisture-detection-responsive controller 102 may be included in the inverter unit 22 which includes the power circuitry 28 including the inverter 31 and which also includes the motor control circuitry 29 configured to control at least the power circuitry 28 in accordance with control from the ECU 21 which is an electronic control unit configured to perform general control of the vehicle. The inverter 31 may be configured to convert a DC from a battery unit 19 that may be mounted to the vehicle into an AC that may be used to drive the motor unit 6. With a configuration where the inverter unit 22 including the moisture-detection-responsive controller 102, an appropriate control can be initiated more quickly than with a configuration of the ECU 21 including moisture-detection-responsive controller 102, thus promptly avoiding various driving problems. Furthermore, with such a configuration, the load on the ECU 21, whose complexity is increasing hand-in-hand with its sophistication, can be reduced. Still, the moisture-detection-responsive controller 102 may be included in the ECU 21 which is an electronic control unit configured to perform general control of the vehicle.

The moisture detector Sk may comprise a continuity sensor or an electrochemical sensor.

The present invention may provide a method of controlling a motor unit 6 in an electric vehicle, with the electric vehicle including an in-wheel motor drive system that includes a wheel bearing unit 4, the motor unit 6 and a reducer unit 7 interposed between the motor unit 6 and the wheel bearing unit 4. The method includes determining if moisture has entered a motor housing 72 of the motor unit 6, and limiting or shutting off a motor current, if it is determined that moisture has entered the motor housing 72. With such a configuration of, upon determining that moisture has entered a motor housing 72 of a motor unit 6, limiting or shutting off a motor current, abnormal short-circuit in the motor unit 6 which may be undergoing rapid rotation can be prevented. This enables avoiding a situation where driving of a vehicle is suddenly impossible.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF THE EMBODIMENTS

Figure 1:
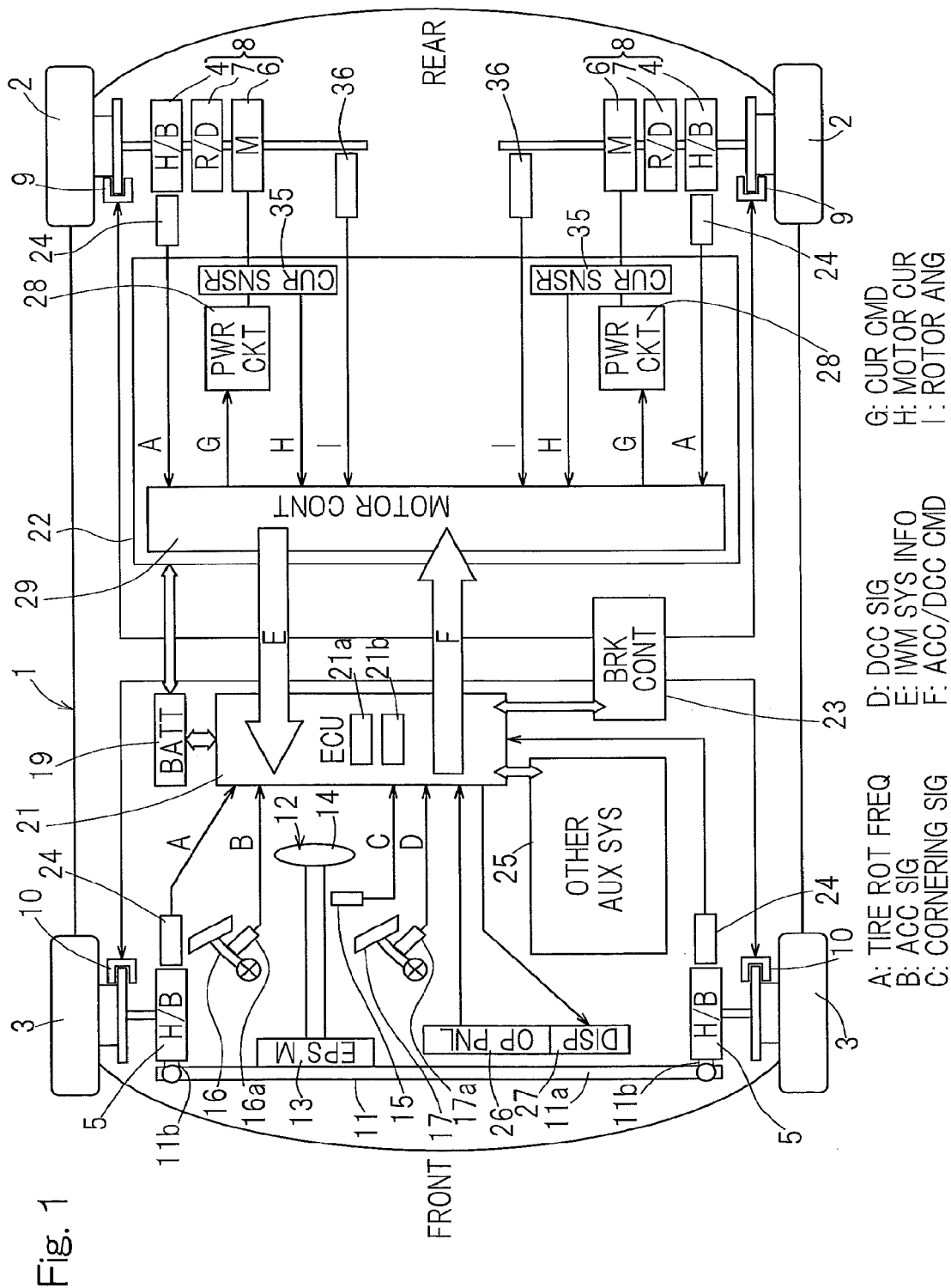
FIG. 1 is a block diagram of a schematic configuration of an electric vehicle, as viewed from top, according to the first embodiment of the present invention.

An electric vehicle according to the first embodiment of the present invention will now be described in connection with FIG. 1 to FIG. 9. The illustrated electric vehicle is a four-wheel vehicle that includes a vehicle body 1 with left and right rear wheels 2 and left and right front wheels 3, with the rear wheels 2 being drive wheels and the front wheels 3 being steered driven wheels. The drive wheels 2 and the driven wheels 3, both equipped with tires, are supported by the vehicle body 1 via respective wheel bearing units 4, 5. In FIG. 1, the wheel bearing units 4, 5 are labeled with "H/B" which is an abbreviation for hub bearing. The left and right drive wheels 2, 2 are driven by respective independent traction motor units 6, 6. Rotation of a motor unit 6 is transmitted via a reducer unit 7 and a wheel bearing unit 4 to a wheel 2. The motor unit 6, the reducer unit 7 and the wheel bearing unit 4 are integrally assembled with each other to form an in-wheel motor drive system 8 that is partly or entirely disposed within the wheel 2. The in-wheel motor drive system 8 may be referred to as an in-wheel motor unit. The motor unit 6 may, without the interposition of the reducer unit 7, directly drive the wheel 2 into rotation. The wheels 2, 3 are equipped with respective electromechanical brakes 9, 10.

The left and right front steered wheels 3, 3 are turnable via a turning mechanism 11 and are steered with a steering mechanism 12. The turning mechanism 11 includes left and right knuckle arms 11b, 11b holding the respective wheel bearing units 5 and also includes a tie rod structure 11a configured to be laterally displaced to change the angles of the left and right knuckle arms 11b, 11b. The lateral movement of the turning mechanism 11 may be caused by a command from the steering mechanism 12, which drives an EPS (Electric Power Steering) motor 13, and via a rotary to linear motion converter mechanism (not shown). A steering angle sensor 15 is configured to sense a steering angle. The output of the steering angle sensor 15 is sent to the ECU 21 in which the sensed information may be used to generate an accelerating/decelerating command for left and right wheels.

Figure 6:
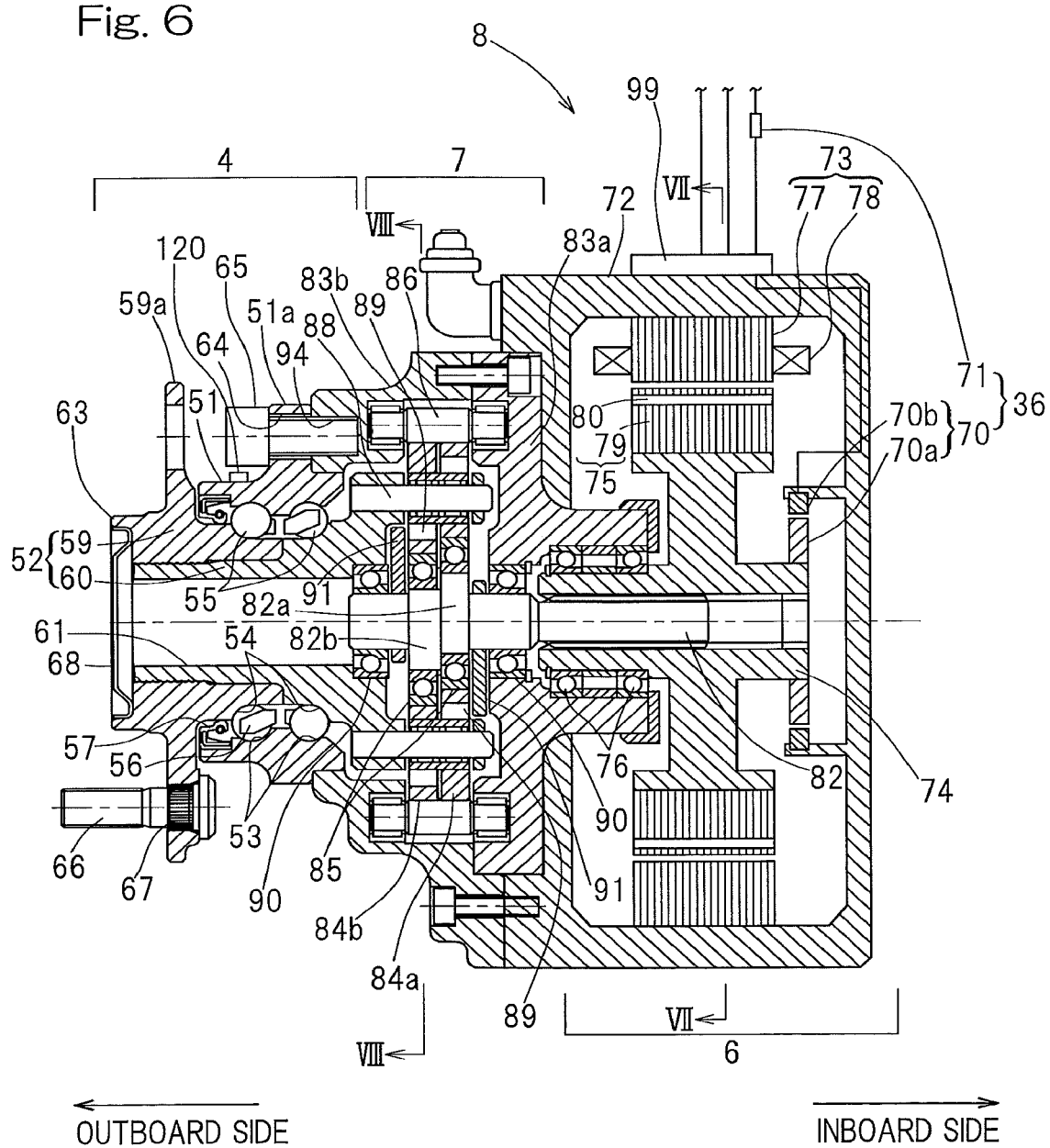
FIG. 6 is a front cut-away view of an in-wheel motor drive system for the electric vehicle.

As shown in FIG. 6, the in-wheel motor drive system 8 includes a wheel bearing unit 4, a motor unit 6 and a reducer unit 7 interposed, in such a manner as illustrated in FIG. 1, between the wheel bearing unit 4 and the motor unit 6, in which the hub of a drive wheel 2 (FIG. 2) supported by the wheel bearing unit 4 is coaxially coupled with a rotational output shaft 74 of the motor unit 6 (FIG. 6). Preferably, the reducer unit 7 has a reduction ratio of 1/6 or greater. The illustrated reducer unit 7 includes a cycloidal reducer which includes a rotational input shaft 82 coaxially connected to the rotational output shaft 74 of the motor unit 6. The rotational input shaft 82 has eccentric segments 82a, 82b. The cycloidal reducer also includes curvilinear plates 84a, 84b mounted via respective bearings 85 to the eccentric segments 82a, 82b, in such a way to transmit the eccentric motions of the curvilinear plates 84a, 84b in the form of a rotary motion to the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The illustrated wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectional shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51a for attaching to an outboard housing 83b of the reducer unit 7. The flange 51a has bolt insertion holes 64 formed at a plurality of circumferential locations thereof. The housing 83b has bolt receiving holes 94 that are internally threaded at locations thereof corresponding to the respective bolt insertion holes 64. The outer member 51 can be mounted to the housing 83b by screwing into the bolt receiving holes 94 the mounting bolts 65 that are pre-inserted in the bolt insertion holes 64.

The inner member 52, which serves as a rotational member, includes an outboard member 59 having a hub flange 59a for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59a has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59a of the outboard member 59 and is protruding towards the outboard side. A cap 68 closing an outboard end of the through bore 61 is fitted to an inner periphery of the pilot portion 63.

The illustrated motor unit 6 includes a radial-gap type, IPM motor (e.g., an Interior Permanent Magnet synchronous motor) that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of the inboard housing 83a of the reducer unit 7.

Figure 7:
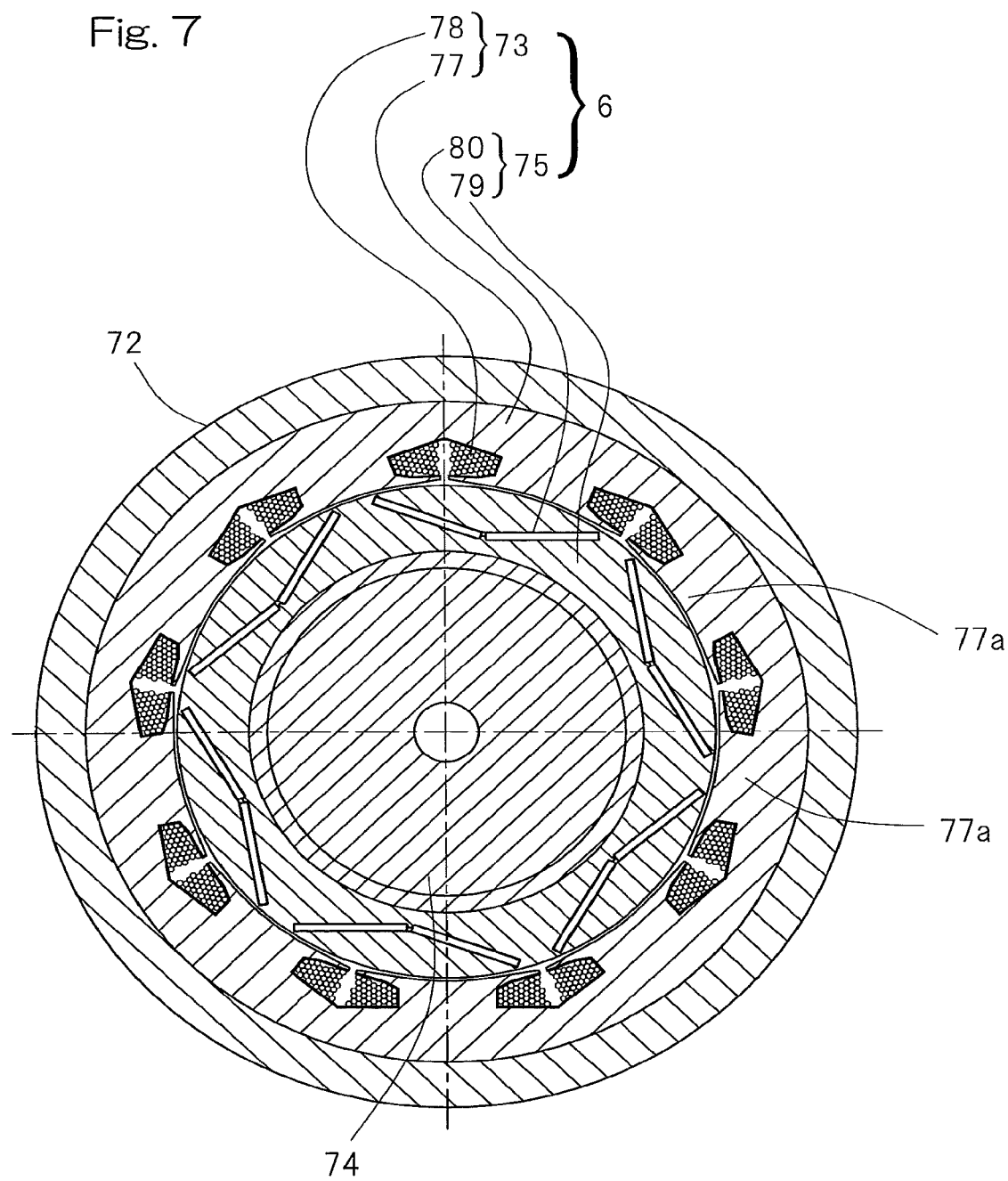
FIG. 7 is a longitudinal cross sectional view of FIG. 6 taken along the line VII-VII, illustrating a motor.

FIG. 7 shows a longitudinal cross sectional view of a motor (taken along the line VII-VII in FIG. 6). The motor rotor 75 of the motor unit 6 may include a rotor core body 79 made of soft magnetic material and may also include a permanent magnet structure 80 incorporated in the rotor core body 79. The permanent magnet structure 80 may include permanent magnets including pairs of two neighboring opposed permanent magnets arranged in circular fashion in the rotor core body 79, where, in each of the pairs, the distance between two neighboring opposed permanent magnets increases along a length of the opposed permanent magnets, as viewed in a cross section thereof. The permanent magnet structure 80 may include a neodymium magnet. The motor stator 73 may include a stator core body 77 made of soft magnetic material and may also include coils 78. The stator core body 77 has a ring-shaped outer peripheral surface having a circular cross section. The stator core body 77 also has an inner peripheral surface having a circumferentially arranged plurality of teeth 77a formed therein that are protruding radially inwards. The coils 78 are wound around the corresponding teeth 77a of the stator core body 77.

The motor unit 6 as shown in FIG. 6 is associated with an angle sensor 36 configured to sense a rotational angle of the motor rotor 75 relative to the motor stator 73. The angle sensor 36 includes an angle sensor body 70 configured to sense signals representing a rotational angle of the motor rotor 75 relative to the motor stator 73 for output and also includes an angle calculation circuit 71 configured to calculate a rotational angle based on the signals produced from the angle sensor body 70. The angle sensor body 70 includes a detectable element 70a associated with the outer peripheral surface of the rotational output shaft 74 and also includes a detector element 70b associated with the motor housing 72. For example, the detector element 70b may be positioned adjacent the detectable element 70a in a radially opposed fashion. The detectable element 70a and the detector element 70b may be positioned adjacent each other in an axially opposed fashion. Here, the angle sensor 36 may include a resolver. To maximize the efficiency of the illustrated motor unit 6, a motor drive controller 33 of a motor control circuitry 29 may be configured to control the timings at which respective phase alternating currents are supplied to the coils 78 of the motor stator 73, based on the rotational angle of the motor rotor 75 relative to the motor stator 73 as sensed by the angle sensor 36.

A connector 99 may be formed at the motor housing 72 for connection of the wires for a motor current in the in-wheel motor drive system 8, wires for various sensors, wires for various commands, and etc.

Figure 8:
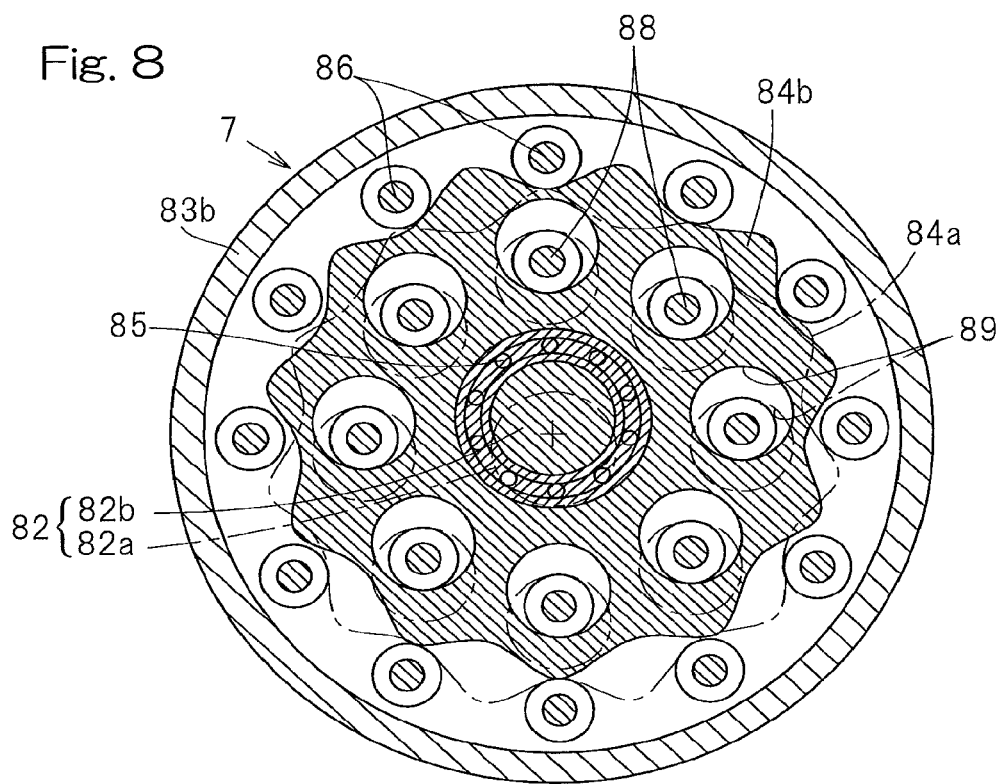
FIG. 8 is a longitudinal cross sectional view of FIG. 6 taken along the line VIII-VIII, illustrating a reducer.

The illustrated reducer unit 7 includes a cycloidal reducer as described. As shown in FIG. 8, the cycloidal reducer includes two curvilinear plates 84a, 84b, each having an outer contour defined by a smoothly corrugated trochoidal curve, that are mounted via respective bearings 85 to the eccentric segments 82a, 82b of the rotational input shaft 82. A plurality of outer pins 86 are fitted to the housing 83b to directly or indirectly guide, along the outer peripheries thereof, the eccentric motions of the curvilinear plates 84a and 84b. A plurality of inner pins 88, which are fitted to the inboard member 60 of the inner member 52, are inserted to a plurality of corresponding, round through holes 89 formed in each of the curvilinear plates 84a and 84b, to directly or indirectly engage with the through holes 89. The rotational input shaft 82 is splinedly connected to the rotational output shaft 74 of the motor unit 6 for co-rotation. The rotational input shaft 82 is supported on both sides thereof, via two bearings 90, by an inboard housing 83a and by an inner diameter surface of the inboard member 60 of the inner member 52.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage reducer unit having such a configuration can achieve a reduction ratio of 1/10 or greater.

The two curvilinear plates 84a, 84b are mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, are each disposed at a side of the corresponding one of the eccentric segments 82a, 82b, in such a way that the counterweights 91 face each other across the eccentric segments 82a, 82b while each of the counterweights 91 being displaced in a direction opposite to the direction of displacement of the corresponding one of the eccentric segments 82a, 82b. In this way, vibrations that may be caused by the curvilinear plates 84a, 84b can be cancelled out.

Figure 9:
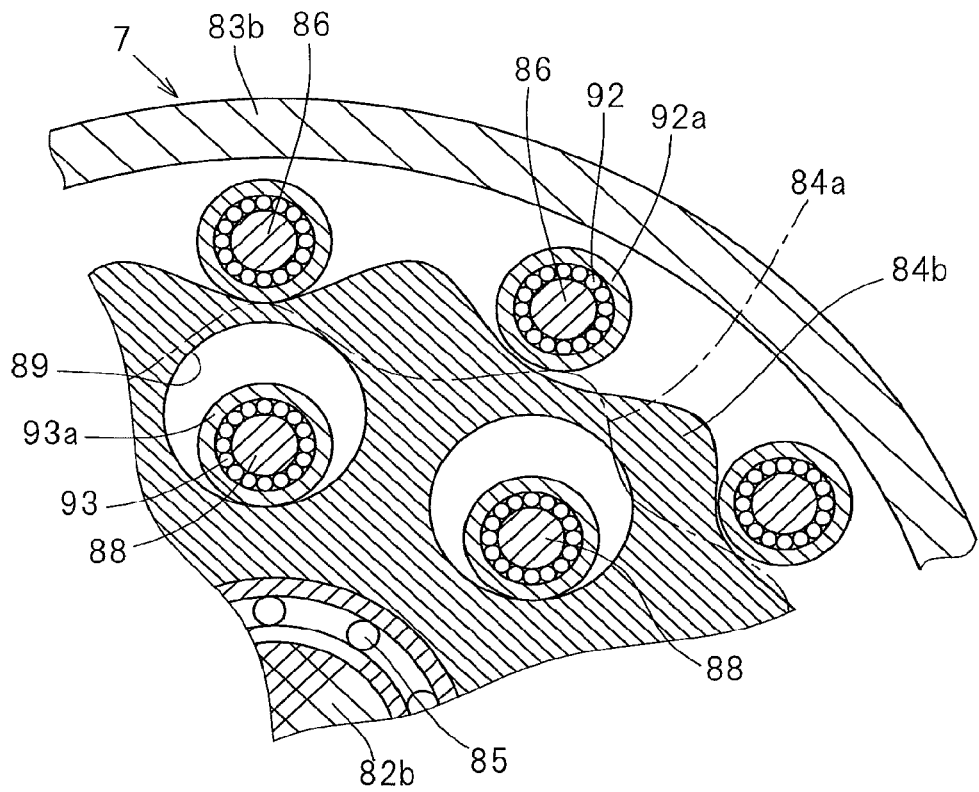
FIG. 9 is a fragmentary enlarged cross sectional view of FIG. 8.

As shown on an enlarged scale in FIG. 9, bearings 92 and bearings 93 may be fitted to the outer pins 86 and the inner pins 88, respectively. The outer rings 92a of the bearings 92 are in rolling contact with the outer peripheries of the curvilinear plates 84a, 84b, while the outer rings 93a of the bearings 93 are in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing for smoother transmission of the eccentric motions of the curvilinear plates 84a, 84b in the form of a rotary motion to the inner member 52.

The wheel bearing unit 4 of the in-wheel motor drive system 8 as shown in FIG. 6 is secured to a vehicle body through the connection between a suspension system (not shown) such as a knuckle and the housing 83b of the reducer unit 7 or an outer periphery of the housing 72 of the motor unit 6.

A control system will be briefly discussed. The vehicle body 1 as shown in FIG. 1 is equipped with an ECU 21 which is an electronic control unit configured to perform general control of the vehicle, an inverter unit 22 configured to perform control of the traction motor units 6, 6 according to commands from the ECU 21, and a braking controller unit 23. The ECU 21 may include a computer, programs that may be executed by the computer, and various electronic circuits.

The ECU 21 may be generally divided, in terms of their functions, into a drive control subunit 21a and a general control subunit 21b. The drive control subunit 21a is configured to generate an accelerating/decelerating command, which will influence the traction motor units 6, 6 of the left and right wheels, based on an accelerating signal produced from an accelerator manipulation unit 16, a decelerating signal produced from a brake manipulation unit 17, and a cornering signal produced from the steering angle sensor 15, and to send the accelerating/decelerating command to the inverter unit 22. In addition, the drive control subunit 21a may be configured to correct the accelerating/decelerating command, based on information indicating the rotational frequency of tire(s) produced from rotation sensor(s) 24 that is/are operatively associated with the wheel bearing units 4, 5 for the respective wheels 2, 3 and/or information produced from various sensors that may be mounted to the vehicle. The accelerator manipulation unit 16 includes an accelerator pedal and a sensor 16a configured to sense the depression of the accelerator pedal to generate the aforementioned accelerating signal. The brake manipulator unit 17 includes a brake pedal and a sensor 17a configured to sense the depression of the brake pedal to generate the aforementioned decelerating signal.

The general control subunit 21b of the ECU 21 is configured to send the decelerating command produced from the brake manipulator unit 17 to the braking controller unit 23, control various auxiliary systems 25, process input signals from an operation panel 26 on a console, cause a display 27 to show information, and/or etc. Examples of the auxiliary systems 25 include an air conditioner, a lamp, a wiper, a GPS, and an airbag. In FIG. 1, the auxiliary systems 25 are indicated in general by a single block.

The braking controller unit 23 is configured to send a braking command to the brakes 9, 10 equipped to the wheels 2, 3, according to the decelerating command received from the ECU 21. Commands related to braking produced from the ECU 21 may include, other than commands generated based on the decelerating signal produced from the brake manipulator unit 17, a command generated by a safety enhancement subunit that may be included in the ECU 21. The braking controller unit 23 may also include an anti-lock-braking system. The braking controller unit 23 may include electronic circuits and/or a microcomputer.

The inverter unit 22 includes a power circuitry 28, which may be provided one for each of the motor units 6, and a motor control circuitry 29 configured to control the power circuitry/circuitries 28. A common motor control circuitry 29 may be provided for different power circuitries 28. Independent motor control circuitries 29 may be provided for respective different power circuitries 28. Such a common motor control circuitry 29 will be configured to control the different power circuitries 28 independently of each other, for example, to achieve different motor torques. The motor control circuitry 29 may be configured to send various information related to the in-wheel motor 8 (which may be referred to as "IWM system information") held by the motor control circuitry 29, such as a variety of detected values or various control values, to the ECU.

Figure 2:
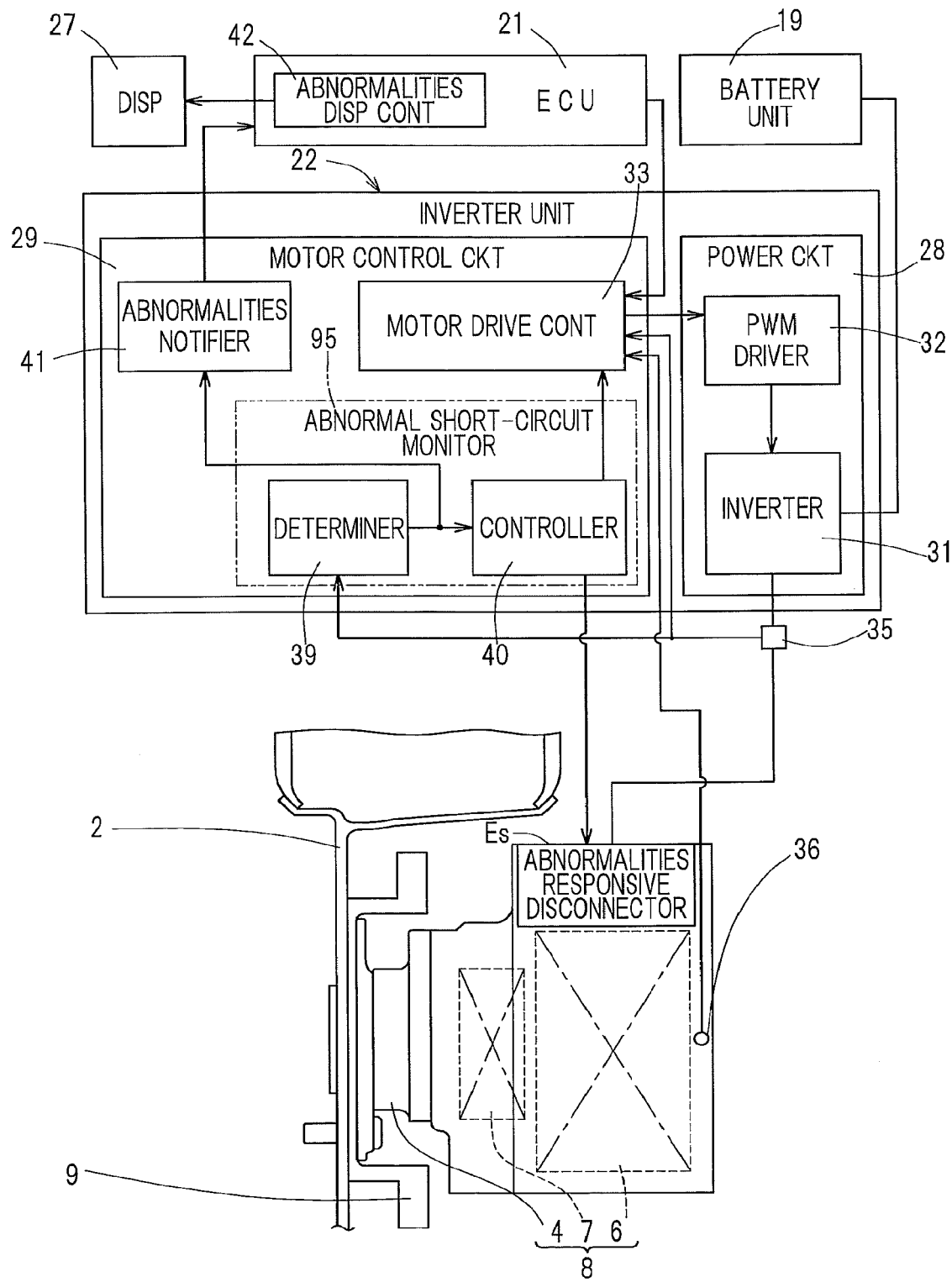
FIG. 2 is a block diagram of a schematic configuration of several features including an inverter unit for the electric vehicle.

FIG. 2 is a block diagram of a schematic configuration of several features including the inverter unit 22. The illustrated power circuitry 28 include an inverter 31 configured to convert a DC power from a battery unit 19 into a three-phase AC power used to drive the motor unit 6 and also include a PWM driver 32 configured to control the inverter 31. The motor unit 6 may include a three-phase synchronous motor. The inverter 31 may include a plurality of semiconductor switching devices (not shown). The PWM driver 32 may be configured to perform pulse width modulation on a received current command by generating ON/OFF commands to the semiconductor switching devices.

The motor control circuitry 29 may include a computer, programs that may be executed by the computer, and various electronic circuits. The motor control circuitry 29 may include a motor drive controller 33 which serves as a basic control component. The motor drive controller 33 may be configured to receive the accelerating/decelerating command such as a torque command from the ECU which serves as an upper-level control unit, convert the accelerating/decelerating command into a current command, and send the current command to the PWM driver 32 of the power circuitry 28. The motor drive controller 33 may be configured to obtain motor current(s) that flow(s) from the inverter 31 to the motor unit 6, with current sensor(s) 35, and perform a current feedback control. The motor drive controller 33 may be configured to obtain a rotational angle of the motor unit 6, with an angle sensor 36, and perform a vector control.

In the embodiment under discussion, the motor control circuitry 29 may include an abnormal short-circuit monitor 95 and an abnormalities notifier 41, and the ECU 21 may include an abnormalities display controller 42, as described below. Furthermore, the motor unit 6 may include an abnormalities-responsive disconnection unit Es, as described below.

The abnormal short-circuit monitor 95 detects an abnormal short-circuit of the motor coils 78 of the motor unit 6. The abnormal short-circuit monitor 95 may be configured to determine if there is an abnormal short-circuit of the motor coils 78, based on respective measurements of supply currents of three phases (U phase, V phase and W phase) that flow from the inverter 31 to the motor unit 6. In particular, the abnormal short-circuit monitor 95 may include a determiner 39 and a controller 40.

Figure 5:
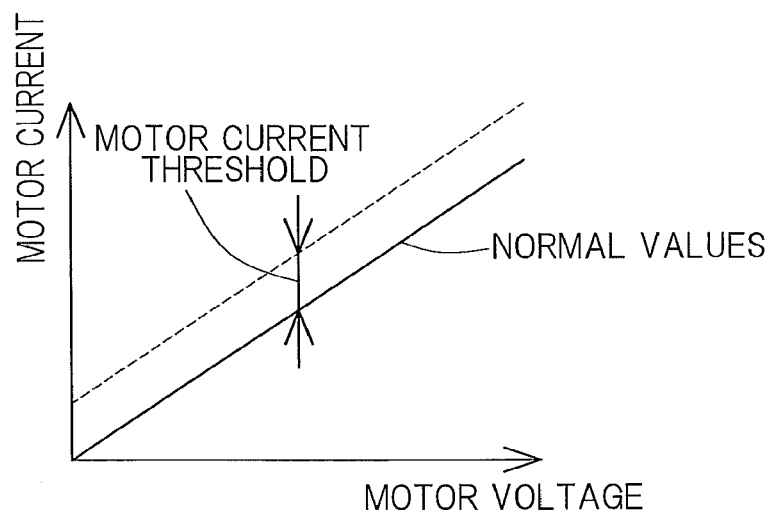
FIG. 5 is a characteristic diagram showing a relationship between a motor voltage and a motor current.

FIG. 5 illustrates a characteristic diagram showing a relationship between a motor voltage and a motor current. The determiner 39 may be configured to obtain, with one or more current sensors 35, respective motor currents of three phases that flow to the motor unit 6 for a given voltage and to determine if any one of the respective motor currents of three phases exceeds a motor current threshold defined for the given motor voltage. Normal values of a motor current may be defined, in one-to-one corresponding relationship, with respect to a given motor voltage. Such normal values may be determined in advance through experiments and/or simulations, and the values of a motor current at which abnormal short-circuits of the motor coils 78 occurred may also be determined. A safety factor may be incorporated into the values of a motor current at which abnormal short-circuits of the motor coils 78 occurred, and the resulting values may be used as the motor current threshold.

Figure 3A:
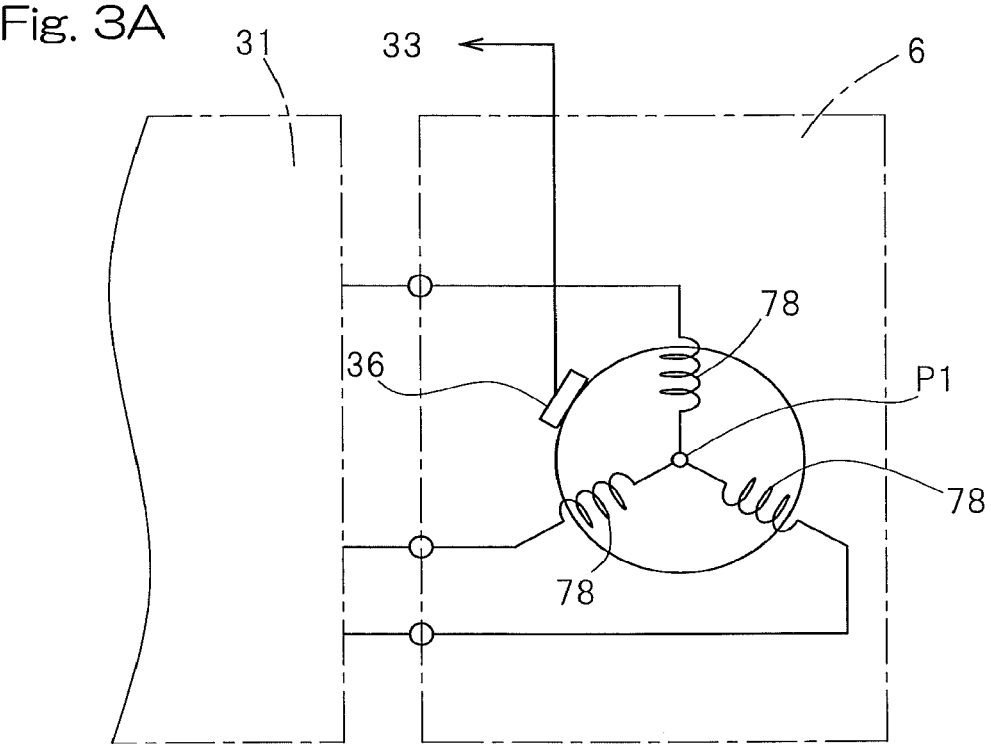
FIG. 3A is a schematic diagram showing an exemplary circuit configuration of a motor unit for the electric vehicle.
Figure 3B:
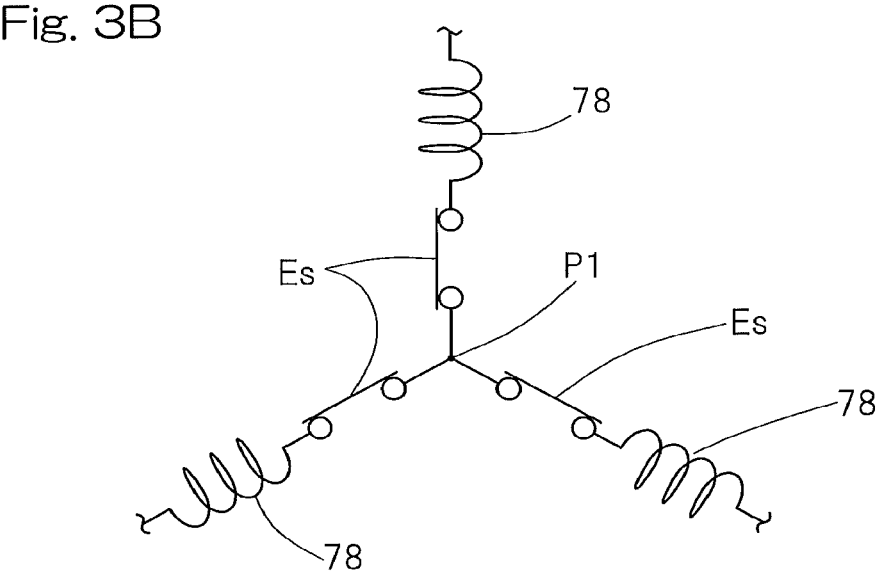
FIG. 3B is a schematic diagram showing how motor coils may be connected with an abnormalities-responsive disconnection unit.

The controller 40 as shown in FIG. 2 may be configured to, if the determiner 39 determines that a motor current exceeds the threshold, command the abnormalities-responsive disconnection unit Es to electrically disconnect the motor coils 78 from a neutral point P1 (FIG. 3A) between the motor coils 78. FIG. 3B schematically illustrates how the motor coils 78 may be connected with the abnormalities-responsive disconnection unit Es. More specifically, the motor coils 78 may be connected with the abnormalities-responsive disconnection unit Es in such a manner as shown in FIG. 4A and/or FIG. 4B.

Figure 4A:
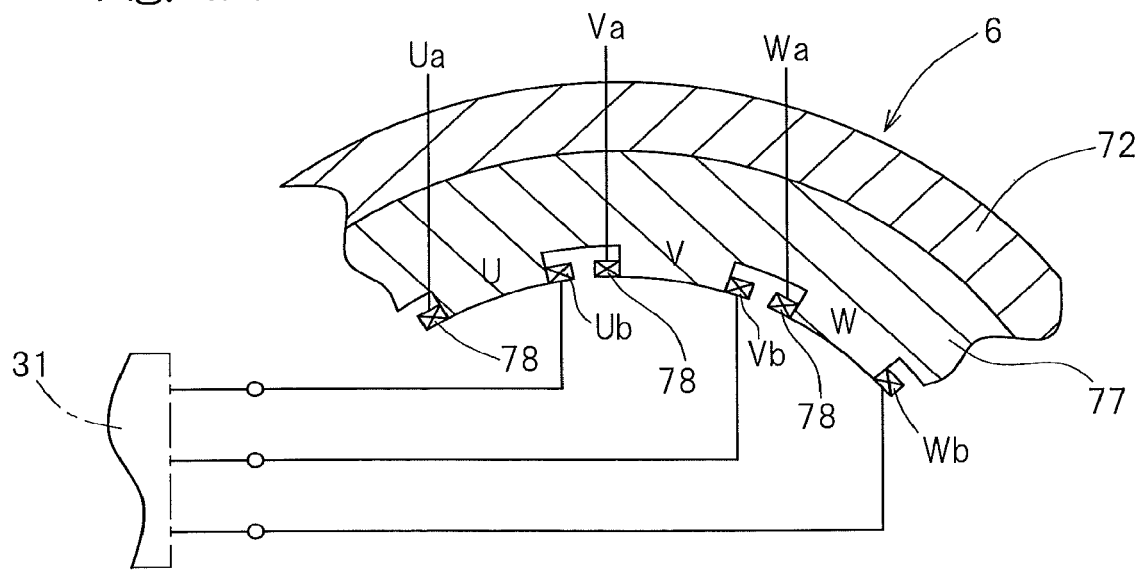
FIG. 4A is a schematic diagram showing how three-phase motor coils of the motor unit may be connected with an inverter.
Figure 4B:
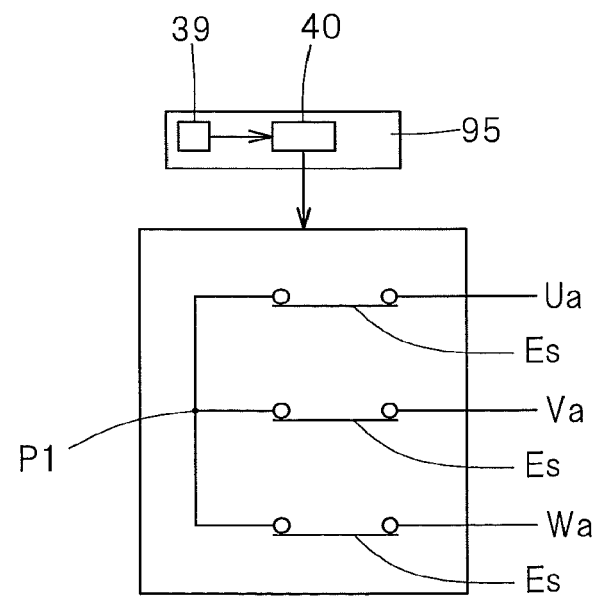
FIG. 4B is a schematic diagram showing an example in which an abnormalities-responsive disconnection unit is each connected with one end of a first motor coil, one end of a second coil and one end of a third motor coil of different phases.

FIG. 4A is a schematic diagram showing how the three-phase motor coils 78 of the motor unit 6 may be connected with the inverter 31, and FIG. 4B is a schematic diagram showing an example in which the abnormalities-responsive disconnection unit Es is each connected with one end of at least one first motor coil 78, one end of at least one second coil 78 and one end of at least third motor coil 78 of different phases. The illustrated motor unit 6 includes a synchronous motor with three-phase motor coils 78. The three-phase motor coils 78 include at least one first motor coil 78, at least one second motor coil 78 and at least one third motor coil 78 of different phases. One end of the at least one first motor coil 78, one end of the at least one second motor coil 78 and one end of the at least one third motor coil 78 are connected with each other at a neutral point P1 in a star connection.

One end Ua of windings of the at least one first motor coil, one end Va of windings of the at least one second motor coil and one end Wa of windings of the at least one third motor coil of the three-phase (U phase, V phase and W phase) motor coils 78, may be connected with each other through an abnormalities-responsive disconnection unit Es which may include the respective relays. The other end Ub of the at least one first motor coil, the other end Vb of the at least one second motor coil and the other end Wb of the at least one third motor coil of the three-phase motor coils 78, may be connected with the inverter 31. In the example under discussion, the relays are so-called normally closed relays such as shown in FIG. 4B. In the figure, all of the three relay contacts are closed during a normal operation. The controller 40 may be configured to, in response to abnormal short-circuit, command the illustrated relays to open all of the three relay contacts. In an example of FIG. 4A, a single pole U, a single pole V and a single pole W are illustrated. However, the number of the circumferentially arranged poles U, W, V may be multiplied. In such a case, at least one first motor coil 78, at least one second motor coil 78 and at least one third motor coil 78 may include series-connected or parallel-connected first, second and third motor coils, respectively, with windings wound around poles of the corresponding phases, and one end of the first motor coils, one end of the second motor coils and one end of the third motor coils may be connected to the abnormalities-responsive disconnection unit Es.

The abnormalities notifier 41 as shown in FIG. 2 may be configured to send information indicating abnormalities to the ECU 21, if the determiner 39 determines that there is an abnormal short-circuit. The abnormalities display controller 42, which may be included in the ECU 21, may be configured to, in response to the information indicating an abnormal short-circuit produced from the abnormalities notifier 41, cause a vehicle driver display 27 to show a presentation that indicates abnormalities. This allows a driver to be quickly aware of the abnormalities and to promptly take appropriate measures or actions such as stopping the vehicle, driving the vehicle at a slower speed, or heading to a repair shop. The presentation that can be shown on the display 27 may include a presentation with letters and/or symbols, such as an icon.

The following advantages or effects may be achieved. With a motor unit including a three-phase synchronous motor, if abnormal short-circuit of motor coils 78 occurs during rotation of the motor unit, a motor current for a given motor voltage may get abnormally high. This may result in undesirable rotational frequency of the motor unit. The abnormal short-circuit 95 may continuously monitor if there is an abnormal short-circuit of the motor coils 78. The determiner 39 of the abnormal short-circuit monitor 95 may determine that there is an abnormal short-circuit of the motor coils 78, if a motor current for a given motor voltage exceeds a motor current threshold defined for the given motor voltage. The controller 40 may, based on the determination made by the determiner 39, command the abnormalities-responsive disconnection unit Es to electrically disconnect the motor coils 78 from a neutral point P1 between the motor coils 78. The abnormalities-responsive disconnection unit Es may, in response to such a command from the controller 40, electrically disconnect the motor coils 78 from the neutral point P1.

Continuously monitoring if there is an abnormal short-circuit of the motor coils 78 allows for early detection of abnormal short-circuit in a motor unit 6, and electrically disconnecting the motor coils 78 from the neutral point P1 if such an abnormal short-circuit is detected can prevent the motor unit 6 from generating undesirable rotational frequency. As noted above, the disconnection occurs at the neutral point P1. In this way, if abnormal short-circuit occurs in any one of the at least one first motor coil, the at least one second motor coil and the at least one third motor coil (U, V, W) of the three-phase motor coils 78, sudden braking of the motor unit 6 can be prevented. This enables avoiding a situation where driving of a vehicle is suddenly impossible.

The abnormalities display controller 42 may, if the determiner 39 determines that there is an abnormal short-circuit of the motor coils 78, cause a vehicle driver display 27 to show a presentation that indicates the abnormal short-circuit. Such a configuration of causing a vehicle driver display 27 to show a presentation that indicates an abnormal short-circuit allows a driver to be quickly aware of the abnormal short-circuit and to promptly take appropriate measures or actions such as stopping the vehicle, driving the vehicle at a slower speed, or heading to a repair shop.

With a configuration where the inverter unit 22 includes the abnormal short-circuit monitor 95, an appropriate control can be initiated more quickly than with a configuration of the ECU 21 including the abnormal short-circuit monitor 95, thus promptly avoiding various driving problems. Furthermore, with such a configuration, the load on the ECU 21, whose complexity is increasing hand-in-hand with its sophistication, can be reduced.

A configuration in which the reducer unit 7 comprises a cycloidal reducer having, for example, a reduction ration of 1/6 or greater (which, in a particular embodiment, may be a reduction ratio of 1/10 or greater), allows for the provision of a smaller motor unit 6, thus achieving reduction in dimensions of the system or assembly. A reducer unit having a significant reduction ratio, while making it possible to achieve reduction in dimensions of the system or assembly as noted above, accompanies significant amplification of torque generated by a motor unit 6 which will be transmitted to the wheel 2. This may result in abrupt braking of the vehicle when abnormal short-circuit of the motor coils 78 occurs. The provision of an abnormal short-circuit monitor 95 can prevent such abrupt braking that may be caused by abnormal short-circuit of the motor coils 78. This enables avoiding a situation where driving of a vehicle is suddenly impossible.

The motor unit 6 may include an interior permanent magnet synchronous motor including a neodymium permanent magnet. This increases the maximum travel range of a vehicle that is possible with a limited battery capacity. An abnormal short-circuit of the motor coils 78 which may occur in a motor unit 6 including an interior permanent magnet synchronous motor is addressed, enabling avoiding a situation where power is generated in the motor unit 6 and the generated power becomes a braking force for the vehicle.

Figure 10:
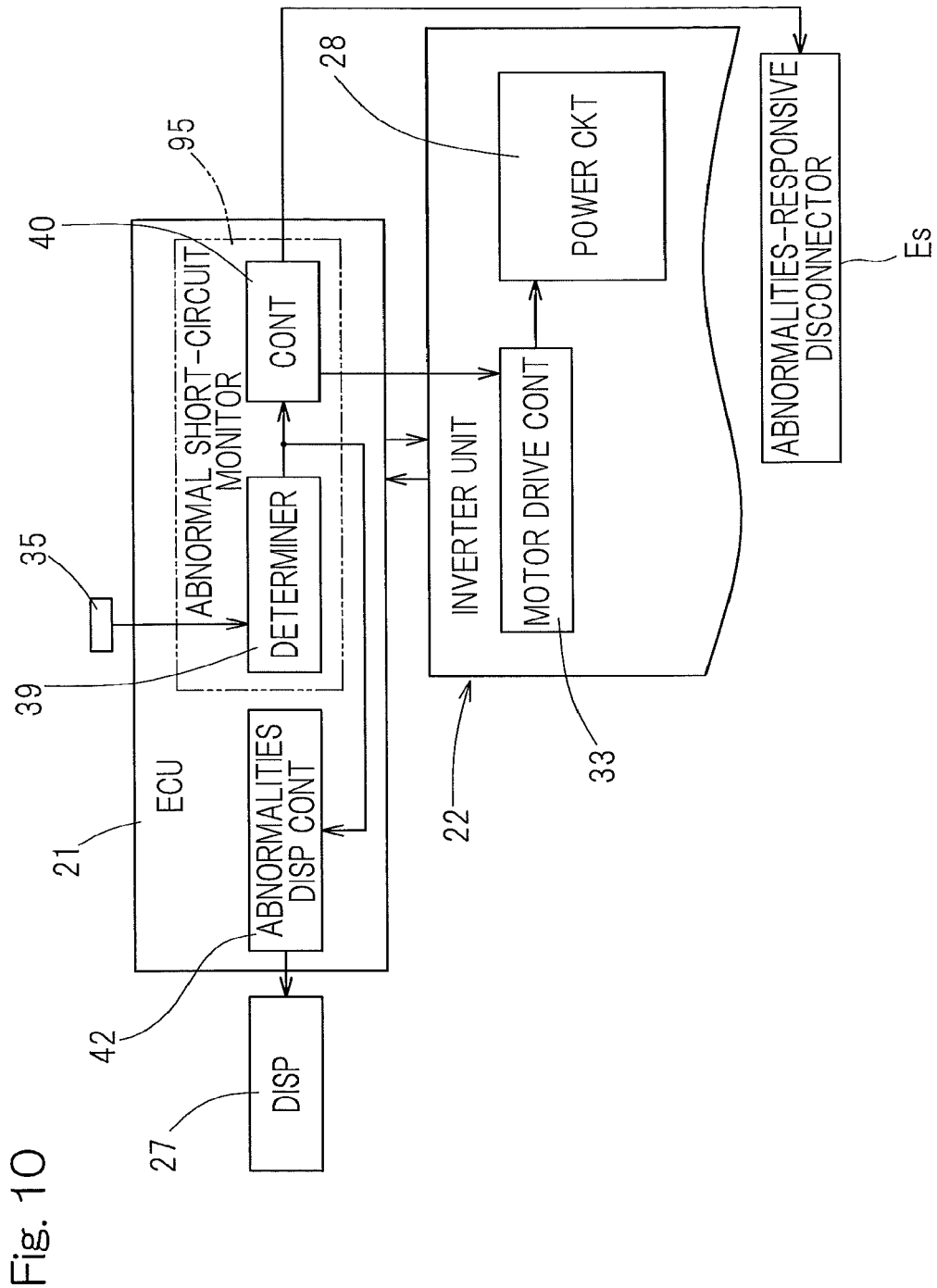
FIG. 10 is a block diagram of a schematic configuration of several features including an ECU, of an electric vehicle according to the second embodiment of the present invention.

As shown in FIG. 10, a control system that may be associated with an in-wheel motor drive system for an electric vehicle according to the second embodiment of the present invention may be configured such that the abnormal short-circuit monitor 95 is included in the ECU 21 which is an electronic control unit configured to perform general control of the vehicle. The abnormalities-responsive disconnection unit Es may not be limited to relay(s) but may comprise other type(s) of electronic switch. In such a configuration, the neutral point P1 in the motor unit 6 may be physically destroyed with electronic swich(es), to electrically disconnect the motor coils 78 from the neutral point P1.

An electric vehicle according to the third embodiment to the fifth embodiment of the present invention will be discussed below. Note that those features corresponding to the features already described with reference to the preceding embodiment(s) will be given the same reference signs and will not be described. In the discussion of a given configuration where only certain features are described, the remaining non-described features should be considered as the same as those already described with reference to the preceding embodiment(s). Also note that beside the combinations of the features described in detail with reference to a certain embodiment, various embodiments themselves can be partially combined with each other unless such combinations are inoperable.

Figure 11:
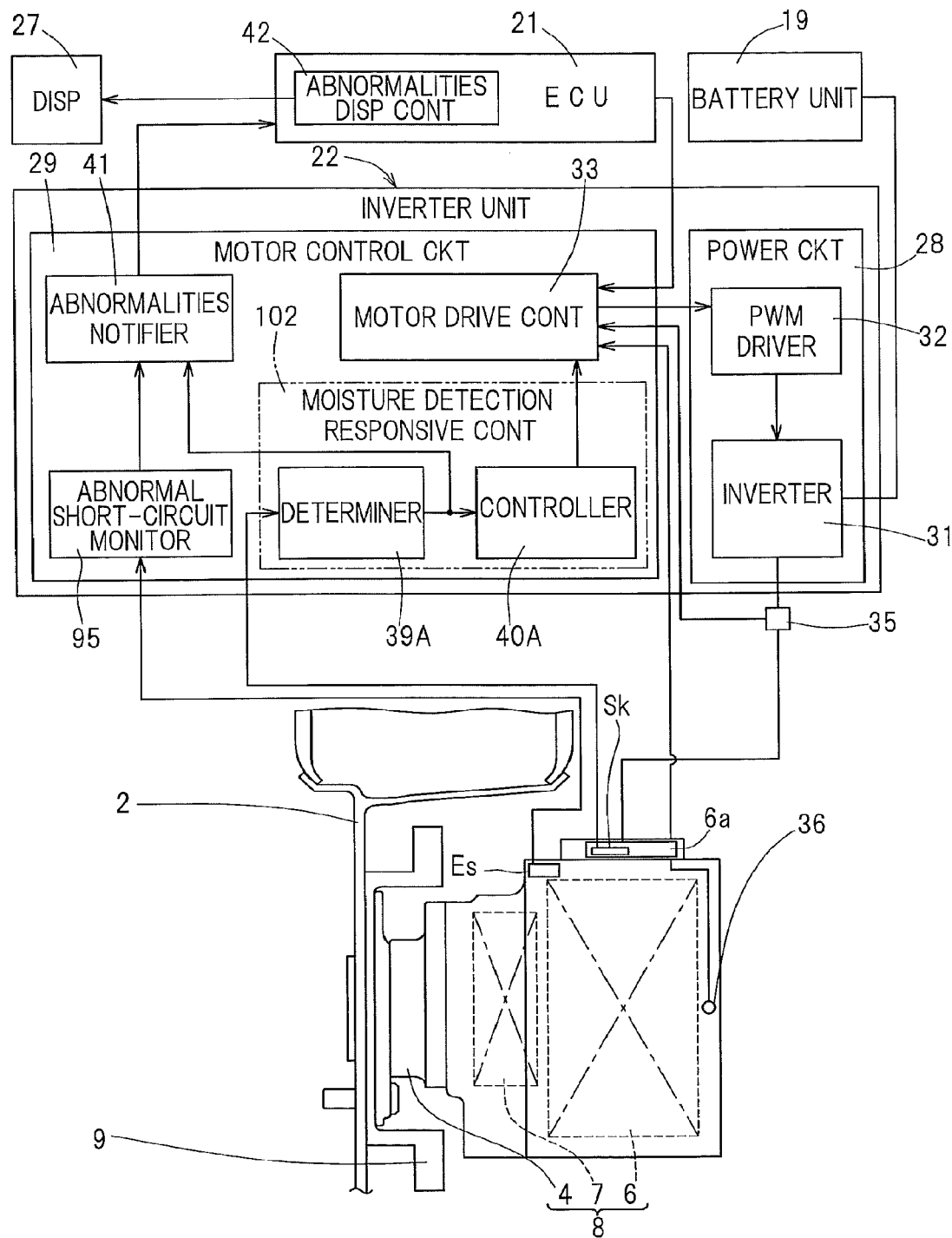
FIG. 11 is a block diagram of a schematic configuration of an electric vehicle according to the third embodiment of the present invention, in which an inverter unit is shown to be including a moisture-detection-responsive controller.
Figure 12A:
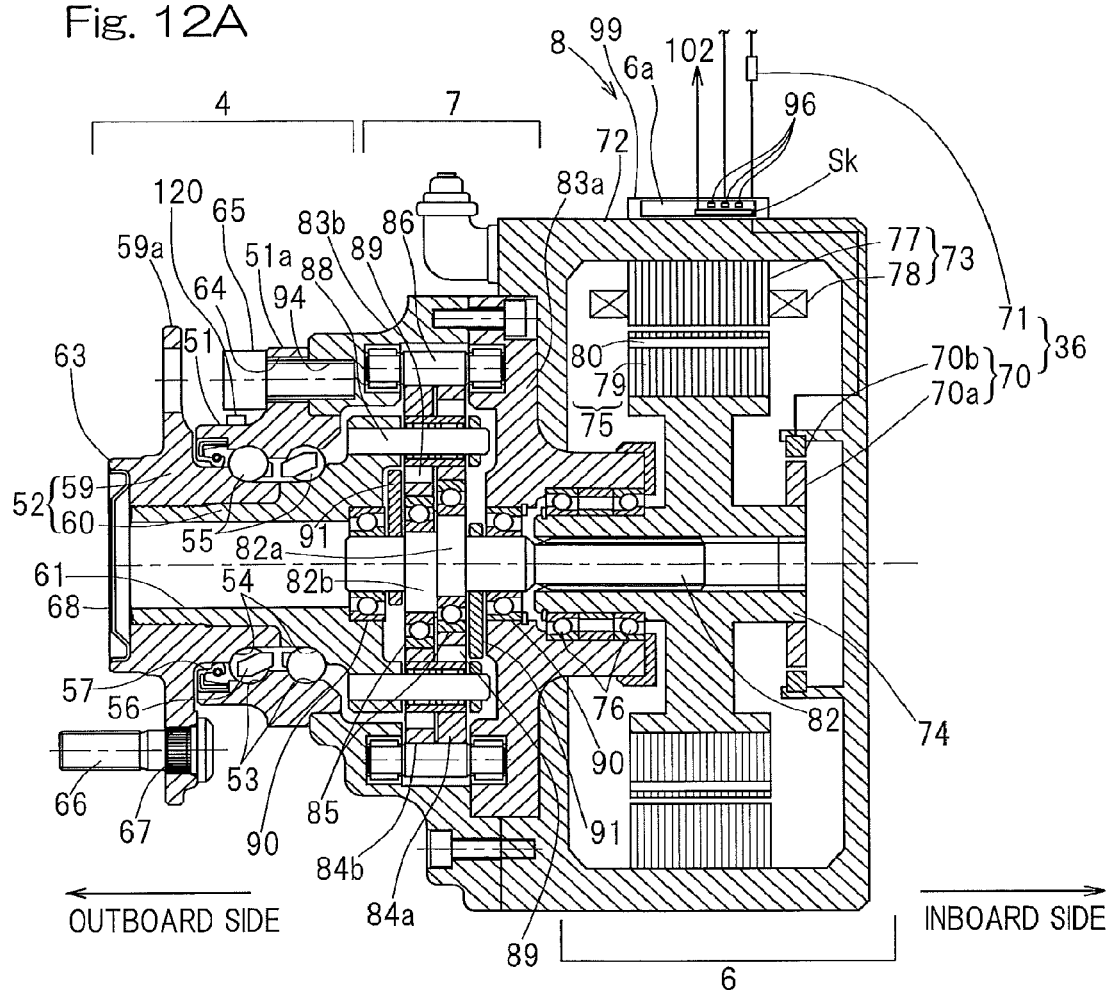
FIG. 12A is a front cut-away view of an in-wheel motor drive system for an electric vehicle according to the third embodiment.
Figure 12B:
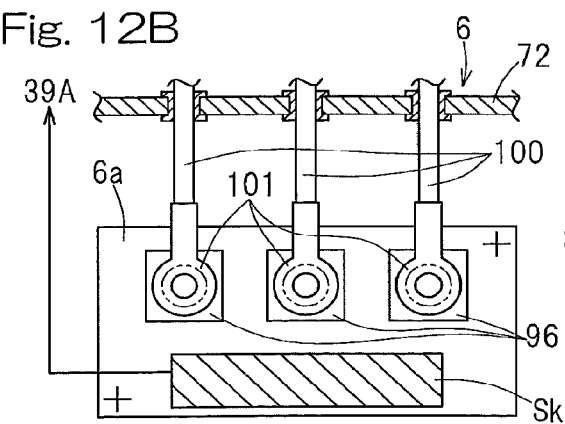
FIG. 12B is a longitudinal cross sectional view showing the region around a terminal block that may be associated with a motor unit of the in-wheel motor drive system.
Figure 12C:
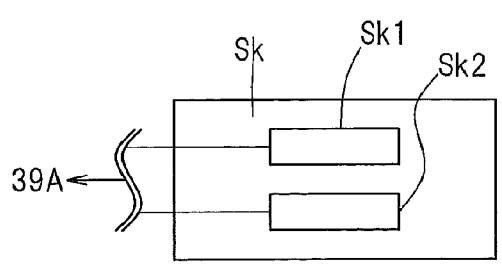
FIG. 12C is a front elevational view of an exemplary moisture detector.

The third embodiment will now be described in connection with FIG. 11 to FIG. 12C. In particular, this embodiment mainly pertains to certain configuration(s) of an inverter unit for an electric vehicle such as shown in FIG. 1. In other words, the description of the first embodiment in connection with FIG. 1 and FIG. 7 to FIG. 9 can also be applied to this embodiment and therefore the corresponding discussion is omitted. This is also true for the subsequent embodiments. FIG. 11 and FIG. 12A are similar to FIG. 2 and FIG. 6, respectively, though with certain differences. The following description also includes a method of controlling a motor unit. An in-wheel motor drive system 8 in accordance with the third embodiment may, in addition to being associated with an abnormalities-responsive disconnection unit Es and an abnormal short-circuit monitor 95 that are discussed in the description of the first embodiment, also be associated with a moisture detector Sk and/or a moisture-detection-responsive controller 102.

As shown in FIG. 12A, a moisture detector Sk configured to detect moisture in the motor unit 6 may be disposed in or inside a terminal block 6a that may be associated with the motor unit 6. As shown in FIG. 12B, the phrase "in the motor unit" used in this context refers to a volume inside the motor housing 72 of the motor unit 6. Wires in the motor unit 6 may be sheathed. The same wires, however, may be unsheathed near the terminal block 6a to expose electrically conductive paths 100 that may include exposed wires and/or connection terminals. Thus, the region around the terminal block 6a where the electrically conductive paths 100 may be exposed may easily form a short-circuit with moisture that has entered the motor unit 6. The provision of a moisture detector Sk in proximity to a terminal block 6a that may be positioned in or within the motor housing 72 enables detecting abnormal short-circuit more effectively.

Examples of the moisture detector Sk include a continuity sensor and an electrochemical sensor. A continuity sensor such as shown in FIG. 12C, which may include two terminals Sk1, Sk2, may be configured to establish continuity between the two terminals Sk1, Sk2 when the two terminals Sk1, Sk2 are both in contact with or immersed in water. An electrochemical sensor, which may include a plurality of electrodes, may be configured to obtain measurement data based on electrochemical current noise that may occur between the electrodes, for detection of moisture based on the measurement data. The moisture detector Sk may be connected with a moisture-detection-responsive controller 102, as will be discussed later.

As shown in FIG. 12B, the terminal block 6a may include a plurality of terminals 96 (which are, in the example under the discussion, three terminals 96) that are positioned in or within a motor housing 72 of the motor unit 6. These terminals 96 may connect between wires in the motor unit 6 assigned to the respective phases and wires outside the motor unit 6. The terminals 96 may include screw terminal(s) or plug-in terminal(s) configured to receive wire terminals 101 formed at ends of wires outside the motor unit 6, to provide a connection with wires in the motor unit 6. The terminals 96 may be positioned at locations in the motor housing 72 where oil cannot access. In other words, the moisture detector Sk may be disposed in proximity to the plurality of terminals 96 that are positioned at such locations in the motor housing 72. In this way, moisture in the volume around exposed portions of the electrically conductive paths 100 can be detected with precision.

In the embodiment under discussion, the aforementioned motor control circuitry 29 of the inverter unit 22 may include the moisture-detection-responsive controller 102 and may also include the abnormalities notifier 41 that is discussed in description of the first embodiment, and the ECU 21 may include the abnormalities display controller 42 that is discussed in description of the first embodiment. The moisture-detection-responsive controller 102 may include a determiner 39A configured to monitor if a moisture detection signal produced from the moisture detector Sk meets a defined condition (i.e., a condition indicative of moisture exceeding a predefined amount), and may also include a controller 40A configured to, if the determiner 39A determines that the moisture detection signal meets a defined condition, limit or shut off a motor current.

A method of controlling the motor unit 6 in accordance with the embodiment under discussion will now be described. Such a method of controlling the motor unit 6 may include determining if moisture has entered a motor housing 72 of a motor unit 6 such as shown in FIG. 12A, and limiting or shutting off a motor current, if it is determined that moisture has entered the motor housing 72.

A moisture detector Sk such as shown in FIG. 11 may comprise a continuity sensor. Such a continuity sensor may include two terminals. The continuity sensor may be configured to establish continuity between the two terminals when the two terminals are both in contact with or immersed in water under the presence of a motor current, and to send a moisture detection signal to the determiner 39A upon the establishment of continuity. The determiner 39A may be configured to monitor the presence/absence of the moisture detection signal, monitor if the receipt of the moisture detection signal continues for at least a predefined time period, or monitor the number of the moisture detection signal received during a predefined time period. It can be estimated that wires for the motor unit 6 are more susceptible to short-circuiting, if the continuity sensor establishes continuity for at least a predefined time period or if the number of the moisture detection signal produced during a predefined time period equals or exceeds a predetermined value. A predefined time period such as discussed above may be determined in the following procedures: Firstly, experiments may be conducted to immerse the motor unit 6 completely in water. Secondly, a plurality of samples of critical time period may be obtained at which an abnormal short-circuit of the motor coils occurred due to moisture or water entering the housing 72. Finally, a time period that is shorter than those samples of critical time period or safer in view of those samples of critical time period, may be used as the aforementioned predefined time period.

The moisture detector Sk may comprise an electrochemical sensor. Such an electrochemical sensor may include a plurality of electrodes. The electrochemical sensor may be configured to produce a moisture detection signal in the form of data based on electrochemical current noise that may occur between the electrodes under the presence of a motor current. The moisture detection signal may be defined by a voltage value. The determiner 39A may be configured to monitor the presence/absence of the moisture detection signal, or monitor if the moisture detection signal exceeds a predefined signal threshold (i.e., a defined condition). Such a predefined signal threshold may be determined in the following procedures: Firstly, experiments may be conducted to immerse the motor unit 6 completely in water. Secondly, a plurality of samples of voltage value produced by the electrochemical sensor may be obtained at which an abnormal short-circuit of the motor coils occurred due to moisture or water entering the housing 72. Finally, a voltage value that is lower than those samples of voltage value may be used as the aforementioned signal threshold. In a configuration where an electrochemical sensor such as discussed above is provided, the determiner 39A may be configured to monitor if the receipt of the moisture detection signal from the electrochemical sensor continues for at least a predefined time period, or monitor the number of the moisture detection signal received during a predefined time period, as in the aforementioned configuration where the determiner 39A is associated with a continuity sensor.

The controller 40A may, if the determiner 39A determines that the moisture detection signal meets a defined condition, limit or shut off a motor current that flows to the motor unit 6. In other words, the controller 40A may limit an output of the inverter unit 22. Along with this, the abnormalities notifier 41 may notify the ECU 21 of abnormalities. The abnormalities display controller 42, which may be included in the ECU 21, may, in response to such notification of abnormalities, cause a vehicle driver display 27 to show a presentation that indicates abnormalities. In addition, the ECU 21 may perform various controls to implement the operation(s) of the controller 40A to limit the output of the inverter unit 22. The controller 40A may be configured to limit a motor current that flows to the motor unit 6, in response to the determiner 39A receiving a moisture detection signal from a continuity sensor or an electrochemical sensor. The controller 40A may be configured to cause a motor current that flows to the motor unit 6 to be "0" ampere or, in other words, shut off the motor current, if the determiner 39A determines that a moisture detection signal meets the defined condition.

In this way, the moisture-detection-responsive controller 102 may, based on a moisture detection signal from the moisture detector Sk, limit or shut off a motor current. This can prevent abnormal short-circuit in a motor unit which may be undergoing rapid rotation. Shutting off a motor current can quickly stop rotation of the motor unit 6, thus preventing, for example, seizure of the motor coils 78. In this way, a situation can be avoided where driving of a vehicle is suddenly impossible. Also, early detection of abnormalities in a motor unit 6 can be achieved, thus avoiding various driving problems. Furthermore, in the aforementioned configuration, the moisture detector Sk may be disposed in proximity to a plurality of terminals. In this way, moisture in the region around exposed portions of the electrically conductive paths 100 can be detected with precision. This not only ensures that moisture which can be the cause for short-circuiting is detected but also ensures that false detections are prevented.

With a configuration where the inverter unit 22 including the moisture-detection-responsive controller 102, an appropriate control can be initiated more quickly than with a configuration of the ECU 21 including moisture-detection-responsive controller 102, thus promptly avoiding various driving problems. Furthermore, with such a configuration, the load on the ECU 21, whose complexity is increasing hand-in-hand with its sophistication, can be reduced. The motor unit 6 may include an interior permanent magnet synchronous motor including a neodymium permanent magnet to provide a highly efficient performance. This increases the maximum travel range of a vehicle that is possible with a limited battery capacity.

Figure 13:
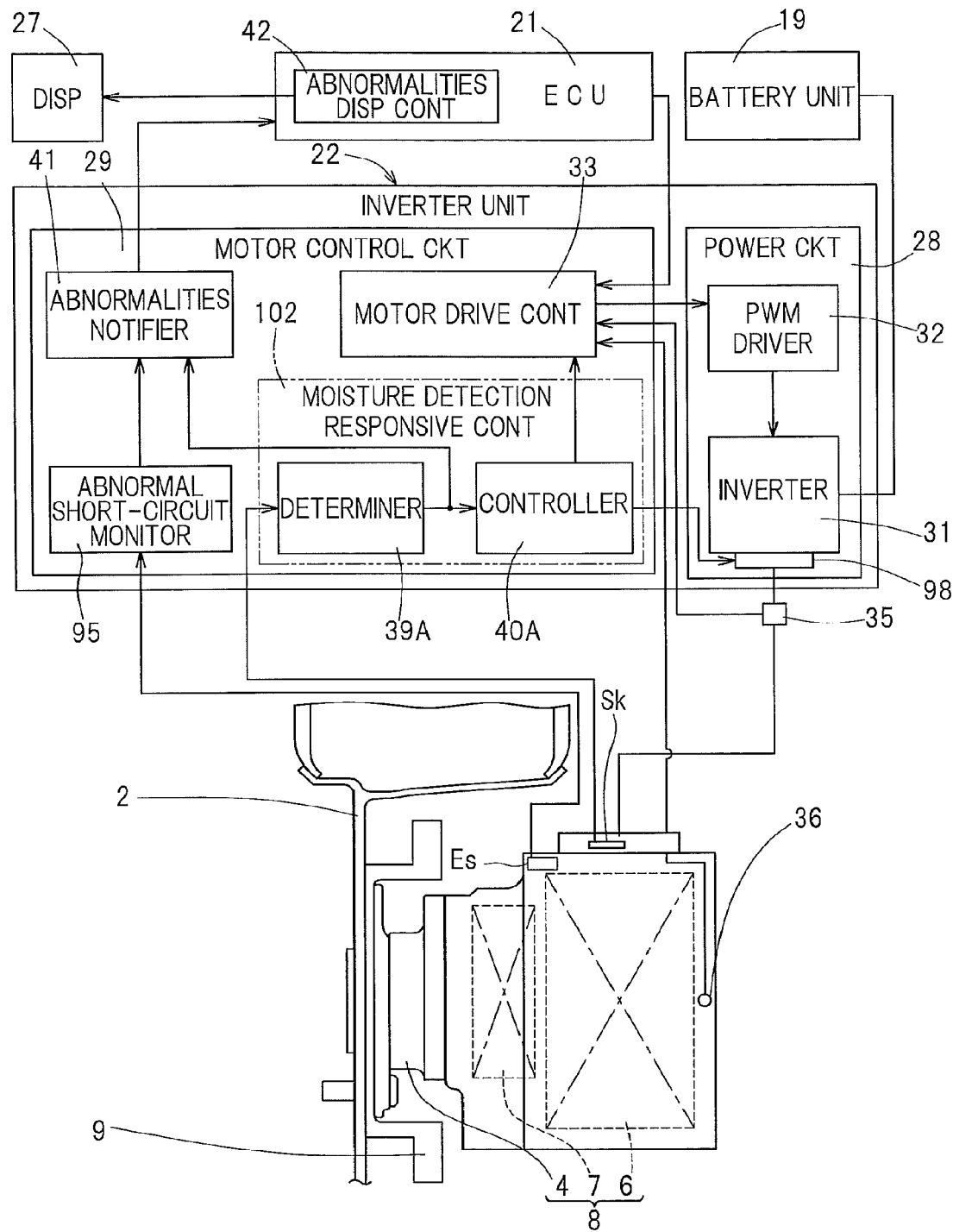
FIG. 13 is a block diagram of a schematic configuration of a control system that may be associated with an in-wheel motor drive system for an electric vehicle according to the fourth embodiment of the present invention.
Figure 14:
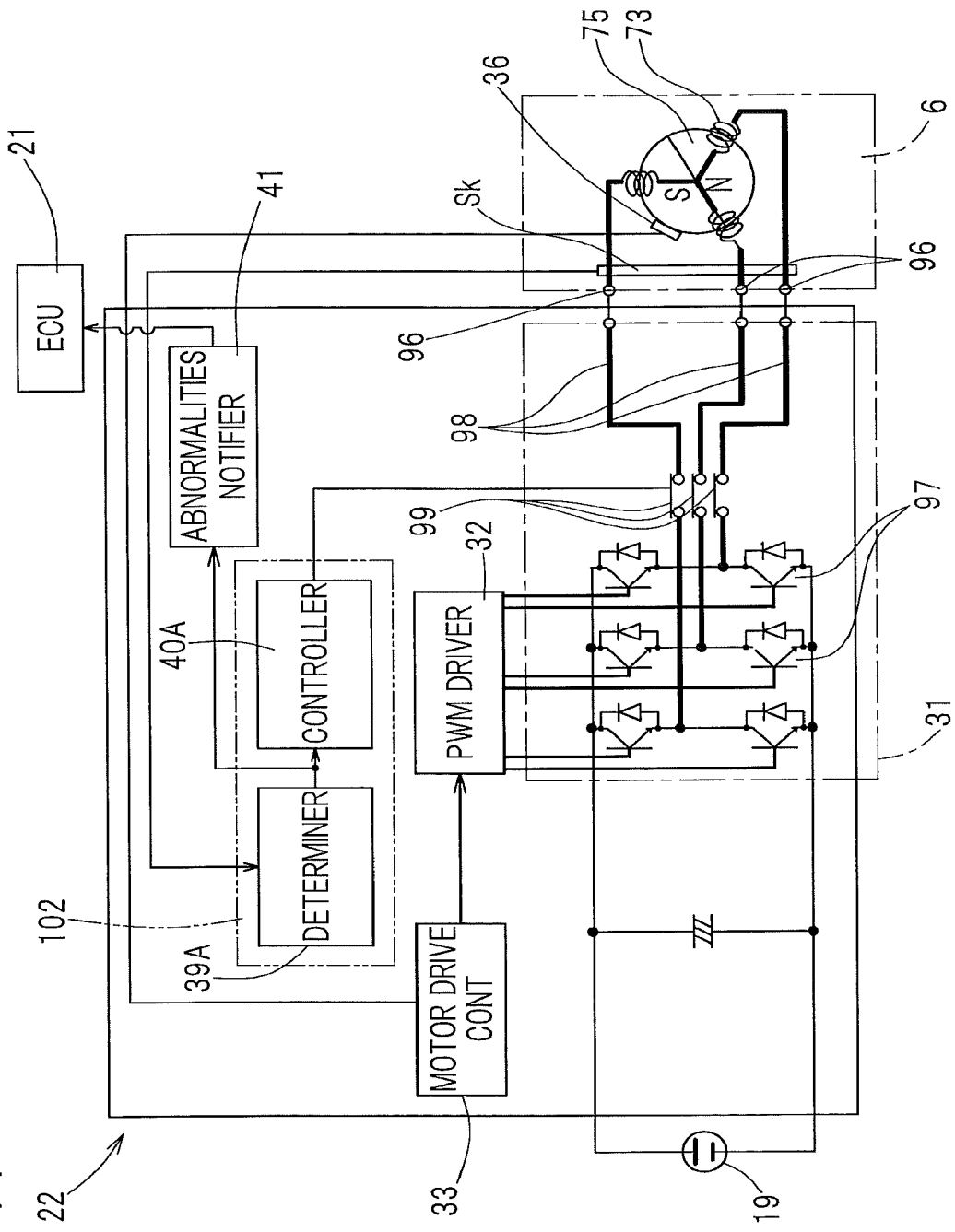
FIG. 14 is a schematic diagram showing an exemplary circuit configuration of a drive unit for a motor unit of the in-wheel motor drive system.

FIG. 13 is a block diagram of a schematic configuration of a control system that may be associated with an in-wheel motor drive system for an electric vehicle according to the fourth embodiment of the present invention. FIG. 14 is a schematic diagram showing an exemplary circuit configuration of a drive unit for a motor unit of the in-wheel motor drive system. In FIG. 14, the abnormal short-circuit monitor 95 is only omitted for illustration purposes. In the example under the discussion, the inverter 31 may include open/close switches 99 between output terminals 98 of the inverter 31 and internal wires of the inverter 31 that are assigned to different phases and are connected to the corresponding drive devices 97 such as switching transistors, such as shown in FIG. 14. The open/close switches 99 may include electromagnetic contactor(s) and/or electromagnetic switch(es). As shown in FIG. 13 and FIG. 14, the controller 40A may be electrically connected with the open/close switches 99.

The controller 40A may be configured to controllably close the open/close switches 99 during a normal operation to allow the flow of a motor current. The controller 40A may be configured to switch the open/close switches 99 into opened state, if the determiner 39A determines that a moisture detection signal meets a defined condition. This causes shut off of a motor current. In this way, a situation can be avoided where driving of a vehicle is suddenly impossible. Such a configuration enables achieving early detection of abnormalities in a motor unit 6, thus avoiding various driving problems.

Figure 15A:
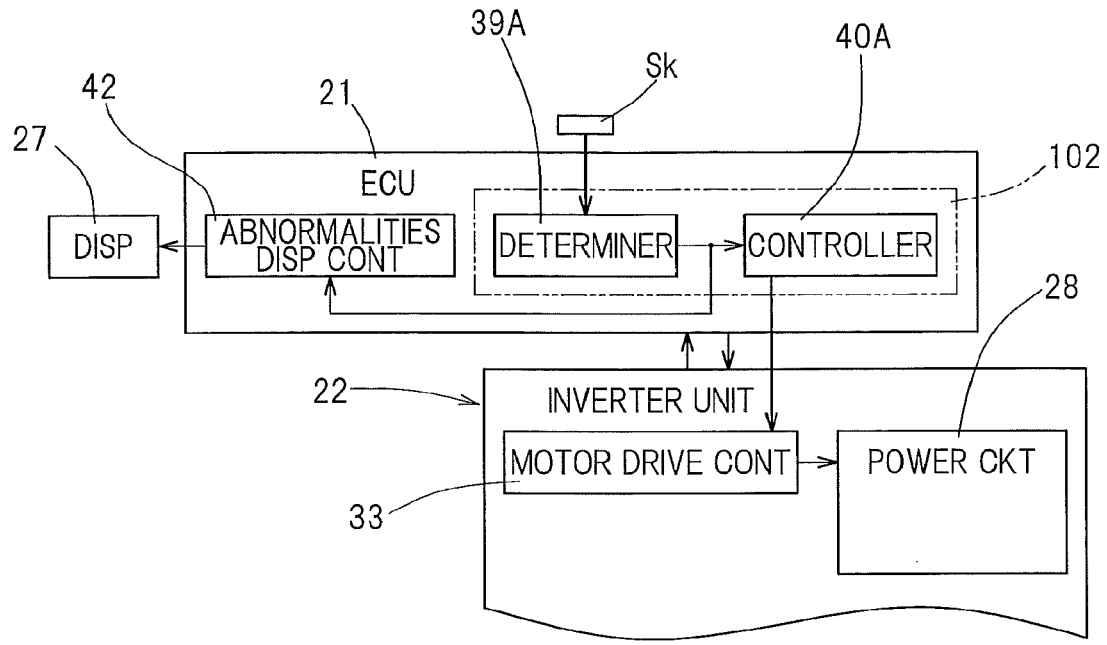
FIG. 15A is a block diagram of a schematic configuration of a control system that may be associated with an in-wheel motor drive system for an electric vehicle according to the fifth embodiment of the present invention.
Figure 15B:
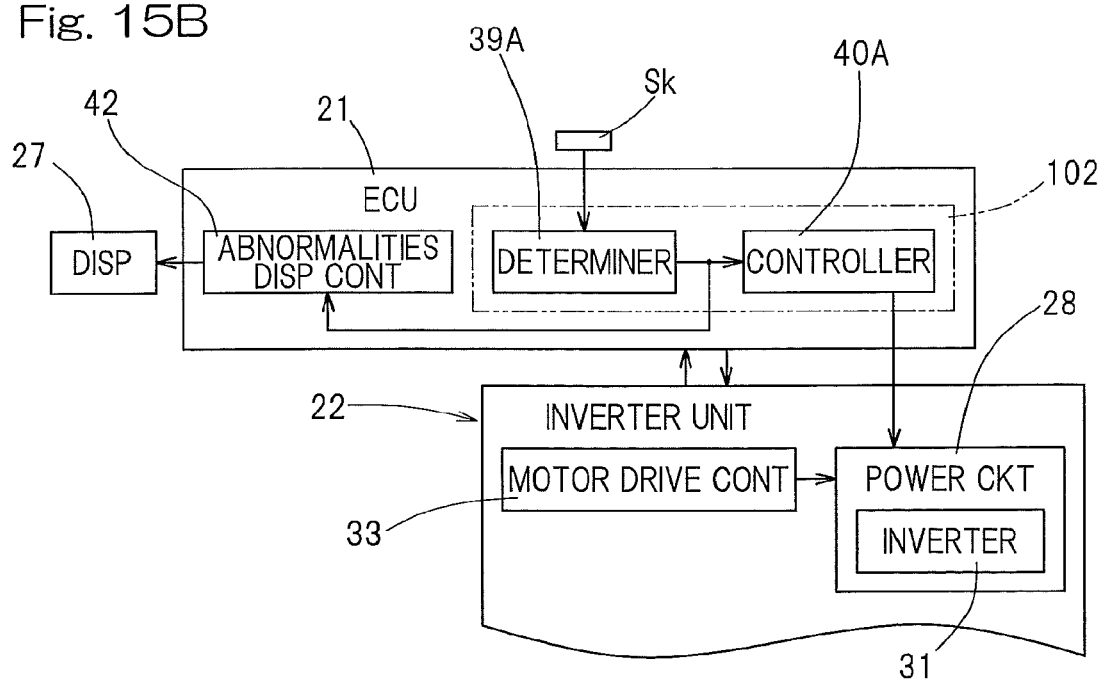
FIG. 15B is a block diagram of a schematic configuration of another control system that may be associated with an in-wheel motor drive system for an electric vehicle according to the fifth embodiment of the present invention.

In the fifth embodiment such as shown in FIG. 15A and FIG. 15B, the moisture-detection-responsive controller 102 may be included in the ECU 21 which is an electronic control unit configured to perform general control of the vehicle. The abnormal short-circuit monitor 95, which is only omitted for illustration purposes, may be included in any one of the inverter unit 22 and the ECU 21. The controller 40A may be electrically connected with the motor drive controller 33 to limit an output of the inverter unit 22, such as shown in FIG. 15A. The controller 40A may be electrically connected with the electromagnetic contactors 99 (see FIG. 14) that may be included in the inverter 31 included in the power circuitry 28, to controllably switch the electromagnetic contactors 99 between the respective open and close positions, such as shown in FIG. 15B.

Application of an in-wheel motor drive system with any one of the aforementioned configurations is not limited to an electric vehicle. Such an in-wheel motor drive system can also be applied to a fuel cell vehicle or a hybrid vehicle.

In one mode of the present invention, "an abnormal short-circuit monitor configured to detect an abnormal short-circuit of the motor coils" in accordance with the present invention may be omitted.

[Mode 1]

An in-wheel motor drive system may be provided which includes a wheel bearing unit, a motor unit and a reducer unit interposed between the motor unit and the wheel bearing unit, with the in-wheel motor drive system further including a moisture detector configured to detect moisture in the motor unit, with the moisture detector being disposed in proximity to a terminal block associated with the motor unit.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS 4, 5: Wheel bearing unit
6: Motor unit
7: Reducer unit
8: In-wheel motor drive system
19: Battery unit
21: ECU 28: Power circuitry
29: Motor control circuitry
31: Inverter
39, 39A: Determiner
40, 40A: Controller
41: Abnormalities notifier
78: Motor coil
95: Abnormal short-circuit monitor
102: Moisture-detection-responsive controller
Es: Abnormalities-responsive disconnection unit
Sk: Moisture detector

What is claimed is:

1. An electric vehicle comprising:
a motor unit configured to drive a wheel, the motor unit including a synchronous motor with three-phase motor coils, the three-phase motor coils including a first motor coil, a second motor coil and a third motor coil of different phases, one end of the first motor coil, one end of the second motor coil and one end of the third motor coil being connected with each other at a neutral point in a star connection;
an ECU which is an electronic control unit configured to perform general control of the vehicle; and
an inverter unit, the inverter unit including:
a power circuitry including an inverter configured to convert a DC power from a battery unit into an AC power used to drive the motor unit; and
a motor control circuitry configured to control at least the power circuitry in accordance with control from the ECU;
an abnormal short-circuit monitor configured to detect an abnormal short-circuit of the motor coils based on individual measurements of each of supply currents of three phases that flow from the inverter to the motor unit; and
an abnormalities-responsive disconnection unit configured to electrically disconnect the motor coils from the neutral point.

2. The electric vehicle as claimed in claim 1, wherein the abnormal short-circuit monitor is configured to determine that there is an abnormal short-circuit of the motor coils, if a motor current for a given motor voltage exceeds a motor current threshold defined for the given motor voltage.

3. The electric vehicle as claimed in claim 1, wherein the inverter unit or the ECU includes the abnormal short-circuit monitor.

4. The electric vehicle as claimed in claim 3, wherein the inverter unit includes the abnormal short-circuit monitor, and wherein the inverter unit also includes an abnormalities notifier configured to send information indicating an abnormal short-circuit to the ECU, if the abnormal short-circuit monitor detects an abnormal short-circuit of the motor coils.

5. The electric vehicle as claimed in claim 1, further comprising an in-wheel motor drive system including:
a wheel bearing unit;
the motor unit; and
a reducer unit interposed between the motor unit and the wheel bearing unit.

6. The electric vehicle as claimed in claim 1, further comprising a reducer unit configured to produce rotation with a speed that is reduced with respect to that of rotation of the motor unit,
wherein the reducer unit comprises a cycloidal reducer.

7. The electric vehicle as claimed in claim 1, wherein the motor unit includes an interior permanent magnet synchronous motor including a neodymium permanent magnet.

8. An in-wheel motor drive system included in the electric vehicle as claimed in claim 5, the in-wheel motor drive system comprising:
a moisture detector configured to detect moisture in the motor unit, the moisture detector being disposed in proximity to a terminal block associated with the motor unit.

9. The in-wheel motor drive system as claimed in claim 8, wherein the terminal block includes a plurality of terminals that are positioned in or within a motor housing of the motor unit.

10. The in-wheel motor drive system as claimed in claim 8, further comprising:
a moisture-detection-responsive controller configured to monitor if a moisture detection signal produced from the moisture detector meets a defined condition and to, upon determining that the defined condition is met, limit or shut off a motor current.

11. The in-wheel motor drive system as claimed in claim 8, wherein the moisture-detection-responsive controller is included in an inverter unit, the inverter unit including:
a power circuitry including an inverter configured to convert a DC power from a battery unit mounted to a vehicle into an AC power used to drive the motor unit; and
a motor control circuitry configured to control at least the power circuitry in accordance with control from the ECU which is the electronic control unit configured to perform general control of the vehicle.

12. The in-wheel motor drive system as claimed in claim 8, wherein the moisture-detection-responsive controller is included in the ECU which is the electronic control unit configured to perform general control of the vehicle.

13. The in-wheel motor drive system as claimed in claim 8, wherein the moisture detector comprises a continuity sensor or an electrochemical sensor.

14. A method of controlling a motor unit in an electric vehicle, the electric vehicle including an in-wheel motor drive system including a wheel bearing unit, the motor unit and a reducer unit interposed between the motor unit and the wheel bearing unit, the method comprising:
disposing inside a terminal block a moisture detector for detecting moisture, the terminal block including a plurality of connection terminals that are positioned in a motor housing of the motor unit, electrically conductive paths, including the connection terminals and wires extending therefrom, having unsheathed and exposed sections;
monitoring if a moisture detection signal produced from the moisture detector meets a defined condition;
determining if moisture has entered a motor housing of the motor unit, the determining including determining that moisture has entered the motor housing upon determining that the defined condition is met; and
limiting or shutting off a motor current, if it is determined that moisture has entered the motor housing.

* * * * *